US012603960B2

(12) United States Patent
Yamaji

(10) Patent No.: US 12,603,960 B2
(45) Date of Patent: Apr. 14, 2026

(54) IMAGE ANALYSIS APPARATUS, IMAGE ANALYSIS SYSTEM, IMAGE ANALYSIS METHOD, PROGRAM, AND NON-TRANSITORY COMPUTER READABLE RECORDING MEDIUM COMPRISING READING A PRINTED MATTER, ANALYZING CONTENT RELATED TO READING OF THE PRINTED MATTER AND ACQUIRING SUPPORT INFORMATION BASED ON AN ANALYSIS RESULT OF THE CONTENT FOR DISPLAY TO ASSIST A USER IN FURTHER READING OPERATIONS

(71) Applicant: FUJIFILM Corporation, Tokyo (JP)

(72) Inventor: Kei Yamaji, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 18/467,670

(22) Filed: Sep. 14, 2023

(65) Prior Publication Data

US 2024/0106936 A1 Mar. 28, 2024

(30) Foreign Application Priority Data

Sep. 27, 2022 (JP) ................................. 2022-153497

(51) Int. Cl.
*H04N 1/00* (2006.01)
*G06T 7/00* (2017.01)
(52) U.S. Cl.
CPC ....... *H04N 1/00039* (2013.01); *G06T 7/0004* (2013.01); *H04N 1/00005* (2013.01);
(Continued)
(58) Field of Classification Search
CPC ........ G06T 2207/30168; G06T 7/0004; H04N 1/00005; H04N 1/00013; H04N 1/00039;
(Continued)

(56) References Cited

U.S. PATENT DOCUMENTS

| | | | | | |
|---|---|---|---|---|---|
| 2004/0208475 | A1* | 10/2004 | Ohmura | ............. | H04N 1/00183 |
| | | | | | 348/E5.042 |
| 2016/0080648 | A1* | 3/2016 | Iguchi | .................. | H04N 23/959 |
| | | | | | 348/222.1 |
| 2021/0211555 | A1* | 7/2021 | Omagari | ............ | H04N 1/00718 |

FOREIGN PATENT DOCUMENTS

| | | | |
|---|---|---|---|
| JP | 2004-139603 | A | 5/2004 |
| JP | 2007-325180 | A | 12/2007 |

OTHER PUBLICATIONS

The extended European search report issued by the European Patent Office on Feb. 5, 2024, which corresponds to European Patent Application No. 23197110.2-1224 and is related to U.S. Appl. No. 18/467,670.

* cited by examiner

*Primary Examiner* — Chad Dickerson
(74) *Attorney, Agent, or Firm* — Studebaker Brackett PLLC

(57) ABSTRACT

Provided are an image analysis apparatus, an image analysis system, an image analysis method, a program, and a recording medium for supporting a user who reads a printed matter and uses data of a read image.

An image analysis apparatus includes a processor, in which the processor executes a process of reading a printed matter on which a captured image is printed to acquire image data of a read image, a process of analyzing a first content related to reading of the printed matter based on the image data, and a process of acquiring first support information based on an analysis result of the first content.

13 Claims, 12 Drawing Sheets

(52) U.S. Cl.
CPC ..... *H04N 1/00013* (2013.01); *H04N 1/00795*
(2013.01); *G06T 2207/30168* (2013.01)
(58) Field of Classification Search
CPC ........... H04N 1/00183; H04N 1/00795; H04N
1/32122; H04N 2201/3242; H04N
2201/3273; G06V 10/25; G06V 20/35
USPC ............................... 358/1.11–1.18, 474, 448
See application file for complete search history.

READING

READ IMAGE

P3

P2

P1

READING

READING

1

IMAGE ANALYSIS APPARATUS, IMAGE ANALYSIS SYSTEM, IMAGE ANALYSIS METHOD, PROGRAM, AND NON-TRANSITORY COMPUTER READABLE RECORDING MEDIUM COMPRISING READING A PRINTED MATTER, ANALYZING CONTENT RELATED TO READING OF THE PRINTED MATTER AND ACQUIRING SUPPORT INFORMATION BASED ON AN ANALYSIS RESULT OF THE CONTENT FOR DISPLAY TO ASSIST A USER IN FURTHER READING OPERATIONS

CROSS-REFERENCE TO RELATED APPLICATIONS

The present application claims priority under 35 U.S.C. § 119 to Japanese Patent Application No. 2022-153497, filed on Sep. 27, 2022. The above application is hereby expressly incorporated by reference, in its entirety, into the present application.

BACKGROUND OF THE INVENTION

1. Field of the Invention

An embodiment of the present invention relates to an image analysis apparatus, an image analysis system, an image analysis method, a program, and a recording medium which analyze a read image acquired by reading a printed matter.

2. Description of the Related Art

In some cases, a printed matter obtained by printing a captured image is read by a smartphone or the like, and image data of the read image is used (see, for example, JP2004-139603A).

SUMMARY OF THE INVENTION

In a case in which the image data of the read image is used as in the technique of JP2004-139603A or the like, there is a case in which a user mistakenly executes a reading operation and fails to read the image. In such a case, in a case in which the user cannot improve the reading operation, there is a possibility that the failure of reading the image is repeated even during the subsequent reading operation.

An aspect of the present invention has been made in view of the circumstances described above to solve the following objects. Specifically, the aspect of the present invention solves the problems in the related art, and is to provide an image analysis apparatus, an image analysis system, an image analysis method, a program, and a recording medium for supporting a user who reads a printed matter and uses data of a read image.

In order to achieve the above object, an aspect of the present invention relates to an image analysis apparatus comprising a processor, in which the processor executes a process of reading a printed matter on which a captured image is printed to acquire image data of a read image, a process of analyzing a first content related to reading of the printed matter based on the image data, and a process of acquiring first support information based on an analysis result of the first content.

In addition, the processor may further execute a process of analyzing a second content related to image capturing of the captured image based on the image data, and a process of acquiring second support information based on an analysis result of the second content.

In addition, the processor may execute the process of acquiring the first support information based on the analysis result of the second content.

In addition, in the process of acquiring the first support information, the processor may acquire the first support information based on the analysis result of the first content and the analysis result of the second content.

In addition, the processor may execute the process of acquiring the second support information based on the analysis result of the first content.

In addition, in the process of acquiring the second support information, the processor may acquire the second support information based on the analysis result of the first content and the analysis result of the second content.

In addition, in the configuration described above, the first support information may be information related to a reading method of the printed matter, and the second support information may be information related to an image capturing method of the captured image.

In addition, in the image analysis apparatus described above, the processor may further execute a process of analyzing a third content related to an image quality of the captured image based on the image data, and a process of acquiring third support information related to an image capturing method or a correction method of the captured image based on an analysis result of the third content.

In addition, in the process of analyzing the first content, the processor may analyze the first content by targeting at least a part of a region of the read image.

More specifically, in the process of analyzing the first content, the processor may specify a presence region of the printed matter from an inside of the read image, and may analyze the first content by targeting at least one of the specified presence region of the printed matter and a region other than the presence region.

In addition, in a case in which the printed matter includes a frame portion that surrounds the captured image, in the process of analyzing the first content, the processor may specify a presence region of the frame portion from an inside of the read image, and may analyze the first content by targeting at least one of the specified presence region of the frame portion and a region other than the presence region.

In addition, in the process of analyzing the second content, the processor may specify a presence region of the captured image from an inside of the read image, and may analyze the second content by targeting the specified presence region of the captured image.

In addition, in a case in which the analysis result of the first content does not satisfy a standard for the first content, the processor may execute the process of acquiring the first support information.

In addition, in a case in which the analysis result of the second content does not satisfy a standard for the second content, the processor may execute the process of acquiring the second support information.

In addition, the first support information may be information including advice on a reading method of the printed matter. In addition, the first support information may include code information for connection to a provision source of support information related to the reading method of the printed matter.

In addition, the second support information may be information including advice on an image capturing method of the captured image. In addition, the second support information may include code information for connection to a provision source of support information related to the image capturing method of the captured image.

In addition, the processor may execute a process of displaying a correction image obtained by correcting the read image according to the analysis result of the first content or the second content on a screen.

In addition, the processor may execute a process of displaying a correction sample image obtained by correcting a sample image different from the read image according to the analysis result of the first content or the second content on a screen.

In addition, the processor may further execute a process of receiving a correction operation executed by a user in a case of correcting the read image, and a process of acquiring fourth support information related to image correction according to the received correction operation.

In addition, in the process of acquiring the fourth support information, the processor may acquire the fourth support information based on a learning result of machine learning based on a usage history of the fourth support information by the user, or a learning result of machine learning based on an execution history of the correction operation by the user.

In addition, another aspect of the present invention relates to an image analysis system comprising a reading apparatus that reads a printed matter on which a captured image is printed to acquire image data of a read image, and a data processing apparatus that receives the image data. Then, the data processing apparatus executes a process of analyzing a first content related to reading of the printed matter based on the image data, and a process of acquiring first support information based on an analysis result of the first content.

In addition, the data processing apparatus described above may further execute a process of analyzing a second content related to image capturing of the captured image based on the image data, and a process of acquiring second support information based on an analysis result of the second content.

In addition, still another aspect of the present invention relates to an image analysis method comprising the following steps:

a step of reading a printed matter on which a captured image is printed to acquire image data of a read image via a processor;

a step of analyzing a first content related to reading of the printed matter based on the image data via the processor; and a step of acquiring first support information based on an analysis result of the first content via the processor.

In addition, in the image analysis method described above may further comprise a step of analyzing a second content related to image capturing of the captured image based on the image data via the processor, and a step of acquiring second support information based on an analysis result of the second content via the processor.

In addition, still another aspect of the present invention relates to a program for causing a computer to execute each step included in the image analysis method described above.

In addition, still another aspect of the present invention relates to a computer-readable recording medium on which a program for causing a computer to execute each step included in the image analysis method described above is recorded.

According to the aspects of the present invention, it is possible to create the information (first support information) for supporting the user who reads the printed matter and uses the data of the read image.

BRIEF DESCRIPTION OF THE DRAWINGS

FIG. 7 is a diagram showing an example of a screen on which third support information is displayed.

DESCRIPTION OF THE PREFERRED EMBODIMENTS

A specific embodiment of the present invention will be described with reference to the drawings. However, the embodiment described below is merely an example for ease of understanding of the present invention, and is not intended to limit the present invention. Moreover, the present invention can be changed or improved from the embodiment described below without departing from the gist of the present invention. Moreover, the present invention includes its equivalents.

In the present specification, the concept of "apparatus" includes a single apparatus that exerts a specific function in one apparatus, and includes a combination of a plurality of apparatuses that are distributed and present independently of each other and exert a specific function in cooperation (coordination) with each other.

In addition, in the present specification, the "image" is composed of a plurality of pixels, and is represented by a gradation value of each of the plurality of pixels. The "image data" is digital image data in which an image is defined at a set resolution, and is generated by compressing data in which the gradation value for each pixel is recorded by a predetermined compression method. Then, by expanding the image data, the image is output and displayed on a display device, such as a display. Examples of the type of the image data include lossy compressed image data, such as joint photographic experts group (JPEG) format, and lossless compressed image data, such as graphics interchange format (GIF) or portable network graphics (PNG) format. In addition, the image data may include data indicating information, such as a file name, an image capturing date and time, and an image capturing location.

In addition, in the present specification, the "user" is a user who uses the image analysis apparatus according to the embodiment of the present invention. The meaning of using the image analysis apparatus is to use a function of the image analysis apparatus, and includes to directly operate the image analysis apparatus, and to use the function of the image analysis apparatus via a device (for example, a user terminal) that can communicate with the image analysis apparatus.

Figure 1:
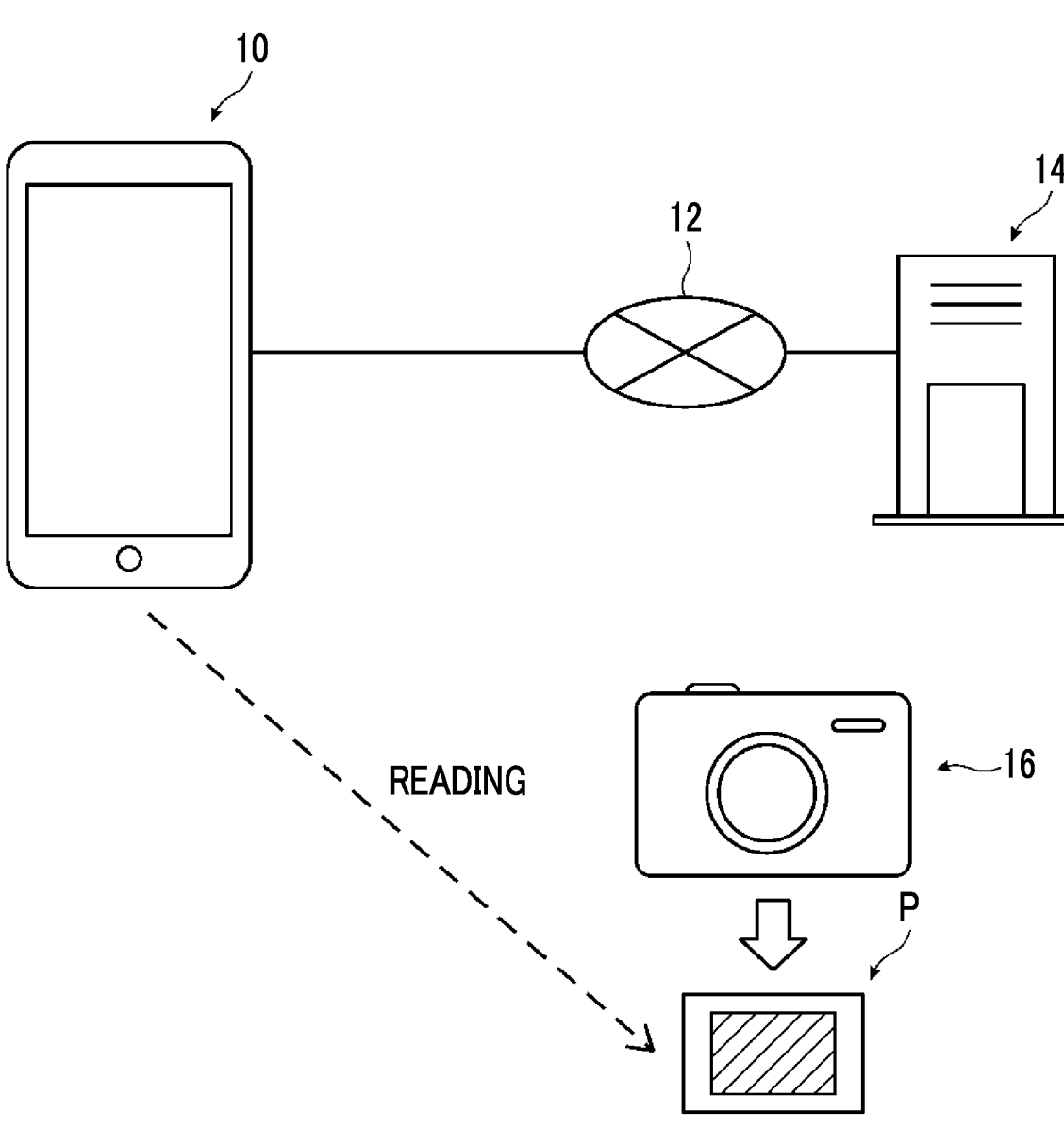
FIG. 1 is a diagram showing an image analysis apparatus and peripheral devices thereof according to an embodiment of the present invention.

About Image Analysis Apparatus and Peripheral Devices According to Embodiment of Present Invention The embodiment of the present invention is an image analysis technique of analyzing a read image obtained by reading a printed matter of a captured image, and is realized by an information processing terminal 10 as an image analysis apparatus shown in FIG. 1. Specifically, the information processing terminal 10 stores a scan application, which is an application program for using the function of the image analysis apparatus according to the embodiment of the present invention (hereinafter, the present embodiment). Details of the scan application will be described below.

The information processing terminal 10 has a communication function, and can obtain information from a device that is present on a network 12 by communicating with the device. Here, the network 12 is a network for external communication, such as the Internet and a mobile network, and the device on the network includes an information provision server 14 shown in FIG. 1. It should be noted that, although only one information provision server 14 is shown in FIG. 1, a plurality of information provision servers 14 can be actually present on the network 12.

The information provision server 14 provides the information according to a transmission request transmitted from the information processing terminal 10. Specifically, in a case in which code information for connection to a provision source of the information, specifically, uniform resource locator (URL) is designated on the information processing terminal 10 side, the information provision server 14 transmits information on a Web page that is present on the URL to the information processing terminal 10. The information processing terminal 10 receives (downloads) the information on the Web page via the network 12. The Web pages provided by the information provision server 14 include a Web page published by a company or a public institution, a Web page opened by an individual including a blog or the like, a Web page for social networking service (SNS) for posting articles posted by a plurality of persons, and a Web page for delivering the posted video.

The information processing terminal 10 comprises an imaging device including an imaging lens and an electronic imaging element, and has a scan function of reading a medium (printed matter P) on which the image is printed. Specifically, the information processing terminal 10 reads (scans) the printed image by capturing the image of the printed matter P. In the present embodiment, the information processing terminal 10 can function as a reading apparatus to acquire the data of the read image (hereinafter, also referred to as read image data).

The information processing terminal 10 need only be any device as long as the communication function and the scan function are provided. For example, the information processing terminal 10 may be configured by using a smart device, such as camera-equipped smartphone and tablet, a camera-equipped personal computer that can perform communication, or another device that can perform communication. Other devices include a digital camera comprising the electronic imaging element, and a printer (excluding a device provided with an imaging function) that can receive the image by communication to print the image on a film or the like. In addition, the digital camera includes a device that does not comprise the printer and a device that is equipped with the printer and can print the image.

It should be noted that, hereinafter, a case in which the information processing terminal 10 is configured by using the smart device will be described as an example.

In addition, the information processing terminal 10 may have a function of correcting the image according to an operation (correction operation) of a user. That is, the information processing terminal 10 may receive the correction operation by the user to execute a correction process based on the correction operation for the image stored in the information processing terminal 10. The images stored in the information processing terminal 10 include an image captured by the camera mounted on the information processing terminal 10, a sample image stored in advance in the information processing terminal 10, an image obtained through communication with the information provision server 14, and the like. In addition, the image captured by the camera mounted on the information processing terminal 10 includes a read image described below.

The correction process is a process of changing or modifying a color, brightness, a sharpness (resolution), a composition, a degree of distortion, or the like of the image that is a correction target by a known image processing technique. Specific examples of the correction process include geometric correction, such as color correction, gradation correction, white balance correction, correction of reducing shake or blurriness, correction of removing noise, and trapezoidal correction. In addition, the correction process for the image including a face of a person as a subject may include correction of red eyes, correction of modification from a face with closed eyes to a face with open eyes, correction of changing an expression, and correction of changing of a skin color or texture.

In the present embodiment, as shown in FIG. 1, a printer-equipped camera 16 is used together with the information processing terminal 10. The printer-equipped camera 16 is an analog camera that can output the printed matter P of the captured image by an instant photography method. That is, in the present embodiment, a film can be accommodated in a camera body of the printer-equipped camera 16, the captured image of the subject (hereinafter, the captured image) can be optically printed on the film, and the film on which the captured image is printed can be output as the printed matter P.

Specifically, in a case in which the user determines an image capturing range and presses an image capturing button, the printer-equipped camera 16 receives the image of the subject within the image capturing range and exposes the image to a photosensitive film (specifically, an instant color film) to form a latent image. Thereafter, a developer pot provided at an end part of the film is broken, a developer in the pot is developed on a film surface, and the film is discharged to the outside of the printer-equipped camera 16. Accordingly, the captured image which has been the latent image is developed and printed on the film, and as a result, the printed matter P on which the captured image which is a full color image is printed is acquired.

It should be noted that the method of printing the captured image on the film is not limited to the instant photography method, and an ink jet method, a sublimation-type thermal transfer method, an electrophotographic method using a toner, or the like may be used. Further, the captured image is not limited to the full color image, and may be a monochrome image.

Figure 2:
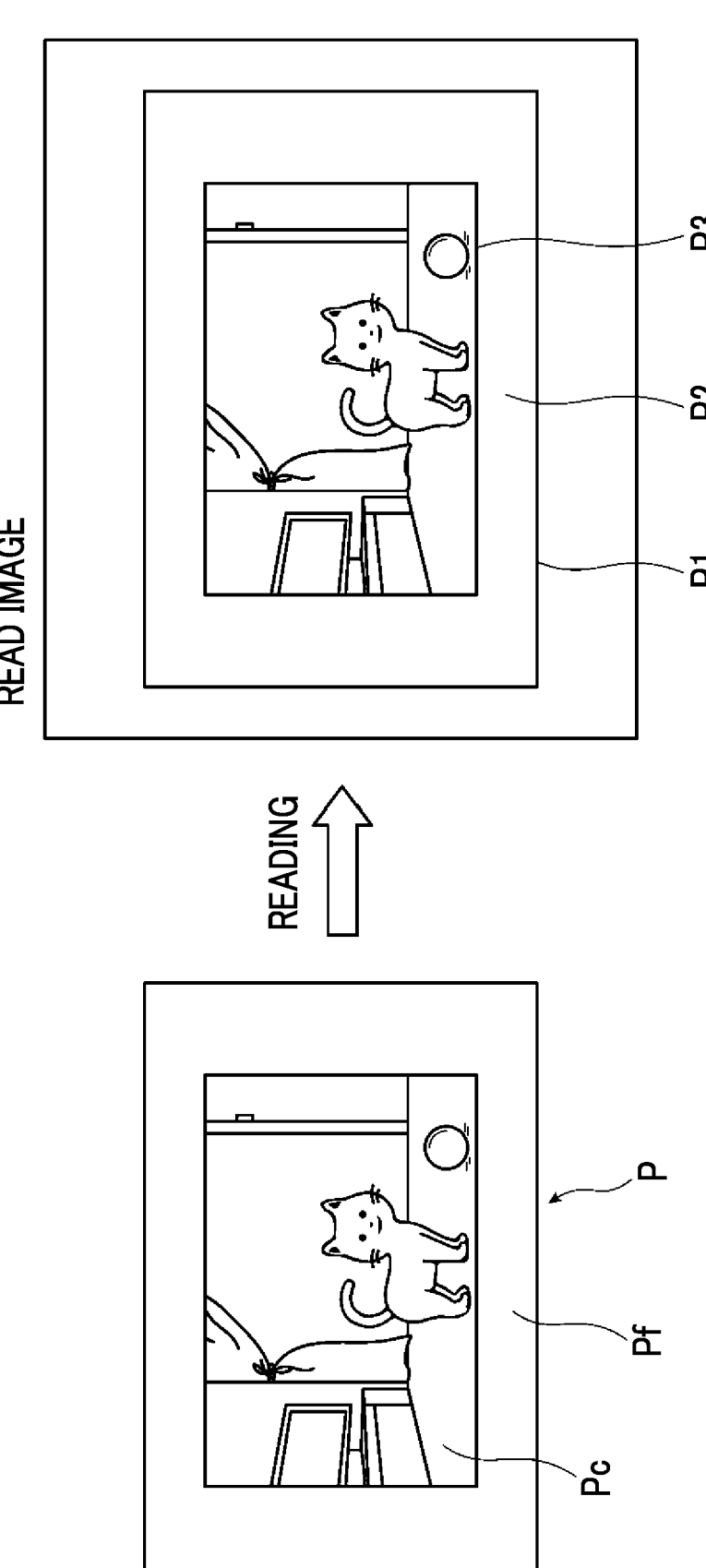
FIG. 2 is an explanatory diagram of a printed matter and a read image thereof.

As shown in FIG. 2, the printed matter P has a rectangular outer shape, and a captured image Pc is printed on one surface of the printed matter P. In the printed matter P according to the present embodiment, the captured image Pc is a color image having a square outer edge, and as shown in FIG. 2, the periphery thereof is surrounded by a plain frame portion Pf. The frame portion Pf is a portion that surrounds the captured image Pc, is white for example, and has a shape of a quadrangular frame. However, the present invention is not limited to this, and the frame portion may be colored, or a pattern may be applied to the frame portion. Further, the shape of the frame portion Pf is not limited to a square frame, and for example, an outer edge or an inner edge of the frame may be a polygon other than a quadrangle, a circle or an ellipse, a star shape, or the like.

In the printed matter P, the color of the captured image Pc is a color that reproduces a color of the subject shown in the captured image Pc, and the color reproducibility reflects the capability (color reproducibility) of the device that outputs the printed matter P. For example, in the printed matter P output by the printer of a certain model, a density of a predetermined color (for example, green) tends to be lower than a density of an ideal reproduction color.

The printed matter P is read by, for example, the information processing terminal 10. Specifically, the user activates the scan application installed in the information processing terminal 10 after acquiring the printed matter P by the procedure described above. After activating the scan application, the user disposes the printed matter P within the image capturing range (angle of view) of the camera mounted on the information processing terminal 10, and reads (specifically, images) the printed matter P by the camera. As a result, the image data (read image data) of the read image of the printed matter P is acquired. As shown in FIG. 2, the read image of the printed matter P includes an image of the printed matter P and an image of the periphery (background) of the printed matter P.

Thereafter, the information processing terminal 10 analyzes the read image based on the acquired read image data by a function of the scan application, acquires support information corresponding to the analysis result, and provides the support information to the user. The support information is information for introducing advice to the user, a success case, or a failure case. The support information that can be provided in the present embodiment includes first support information related to a reading method of the printed matter P, second support information related to an image capturing method of the image (captured image), and third support information for obtaining an image having a higher image quality. The third support information includes information related to an image capturing method of an image suitable for an imaging scene or information related to a correction method of the captured image.

In the present embodiment, each of the support information is provided to the user by being displayed on a display provided in the information processing terminal 10. As a result, the user can check the provided support information on the information processing terminal 10, and can utilize the support information for the image capturing or reading (scanning) of the printed matter P from the next time onward.

Figure 3:
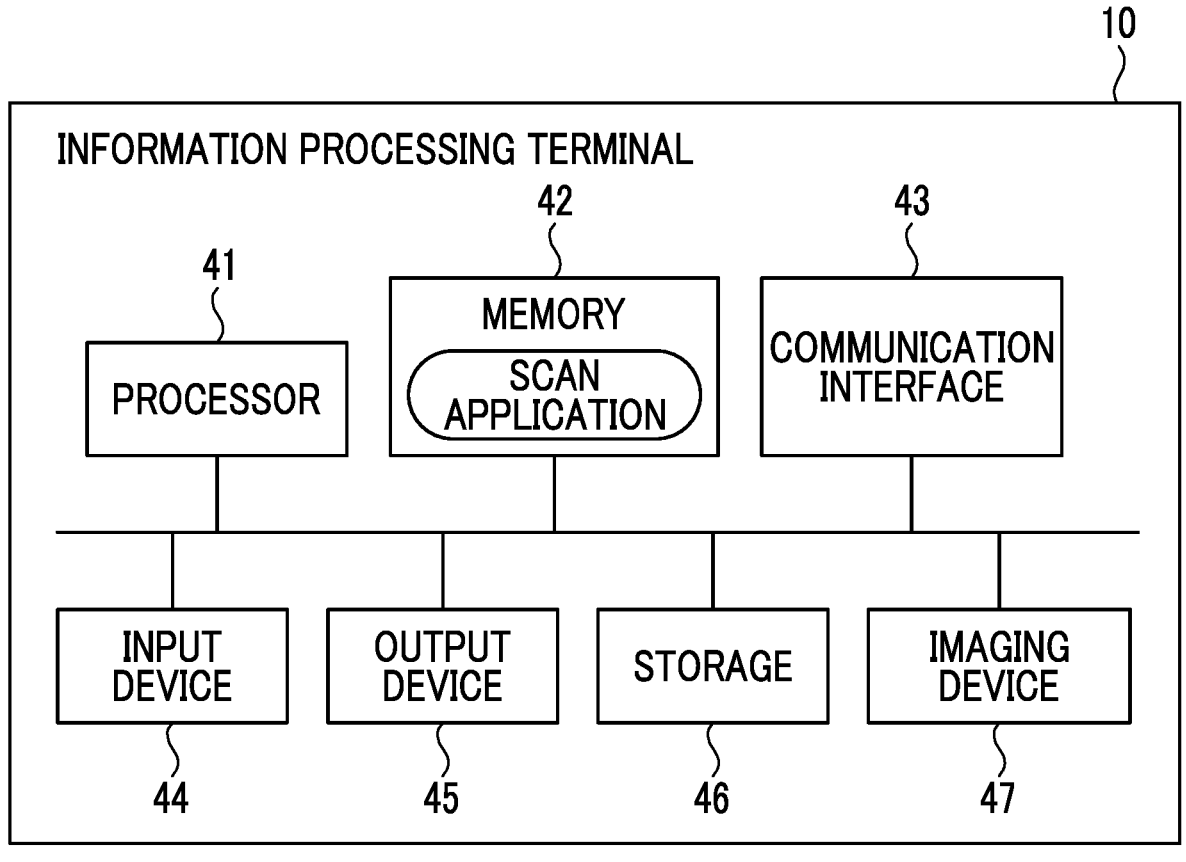
FIG. 3 is a diagram showing a hardware configuration of the image analysis apparatus according to the embodiment of the present invention.

About Configuration Example of Image Analysis Apparatus According to Embodiment of Present Invention A configuration of the information processing terminal 10, which is the image analysis apparatus according to the present embodiment, will be described with reference to FIG. 3. As shown in FIG. 3, the information processing terminal 10 comprises a processor 41, a memory 42, a communication interface 43, an input device 44, an output device 45, and a storage 46.

The processor 41 is configured by using, for example, a central processing unit (CPU), a graphics processing unit (GPU), a digital signal processor (DSP), or a tensor processing unit (TPU). The memory 42 is configured by using, for example, a semiconductor memory, such as a read only memory (ROM) and a random access memory (RAM). The communication interface 43 is configured by using, for example, a network interface card or a communication interface board. The input device 44 includes a device that receives a user operation, such as a touch panel and a cursor button. The output device 45 includes a display device, such as a display.

The storage 46 stores data necessary for the information processing terminal 10 to execute various processes. It should be noted that the storage 46 may be configured by using a storage apparatus built in or externally attached to the information processing terminal 10, or may be configured by using a network attached storage (NAS) or the like. Alternatively, the storage 46 may be configured by using an external device that can communicate with the information processing terminal 10 via the network 12, such as online storage.

The application program including an operating system (OS) and the scan application is stored in the memory 42. The scan application is a program for causing the information processing terminal 10 to function as the image analysis apparatus according to the present embodiment. The application program may be acquired by being read from a computer-readable recording medium, or may be acquired by being downloaded through a communication network, such as the Internet or an intranet.

In addition, as shown in FIG. 3, the information processing terminal 10 according to the present embodiment further comprises an imaging device 47 including the imaging lens and the electronic imaging element. The imaging device 47 has the same configuration as the camera mounted on the smartphone.

Next, with reference to FIG. 4, the configuration of the information processing terminal 10 according to the present embodiment will be described again from a functional aspect.

Figure 4:
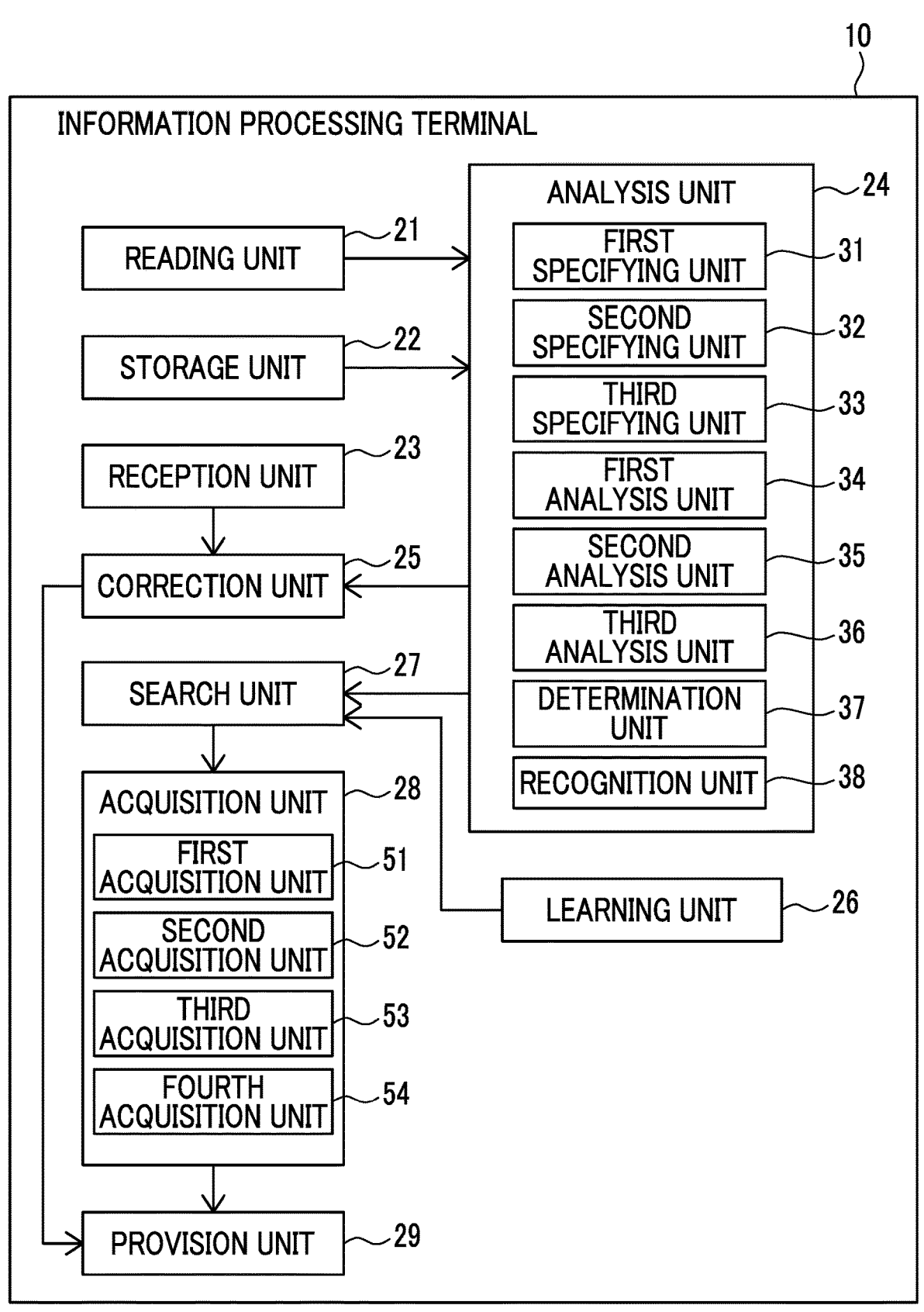
FIG. 4 is an explanatory diagram of a function of the image analysis apparatus according to the embodiment of the present invention.

As shown in FIG. 4, the information processing terminal 10 includes a reading unit 21, a storage unit 22, a reception unit 23, an analysis unit 24, a correction unit 25, a learning unit 26, a search unit 27, an acquisition unit 28, and a provision unit 29. These functional units are realized by cooperation between a hardware device provided in the information processing terminal 10 and various programs (software) including the scan application. Some functions (for example, the learning unit 26) may be realized by artificial intelligence (AI).

Hereinafter, each functional unit will be described.
Reading Unit

The reading unit 21 controls the imaging device 47 to read the printed matter P at a predetermined resolution, and acquires the image data of the read image. Here, the image quality of the read image, that is, a quality of the reading of the printed matter P can be affected by the reading method of the printed matter P. The reading method of the printed matter P can include a reading sensitivity, a direction of the imaging device 47, brightness of a space on which the printed matter P is placed, a type and a luminescence intensity of a light source, a focal position, a positional relationship between the light source and the printed matter P, a posture of the printed matter P, and the presence or absence of movement (shake) of the hand gripping the printed matter P, and the like.

Storage Unit

The storage unit 22 stores various types of data referred to by the analysis unit 24, the correction unit 25, the learning unit 26, and the search unit 27 in a case of executing the corresponding process. For example, the storage unit 22 stores an execution history of the correction process based on the operation of the user and a reference history of the support information by the user. In addition, table data indicating a correspondence relationship between the analysis result and the support information (specifically, the URL of the support information) is stored in the storage unit 22. Further, a learning result by the learning unit 26, more specifically, a mathematical model for estimation or prediction constructed by machine learning is stored in the storage unit 22.

Reception Unit

In the reception unit 23, the user receives the operation (user operation) via the input device 44. The user operation received by the reception unit 23 includes various selections, designations, instructions, requests, commands, permission or denial, registrations, and other operations. The other operations include the correction operation executed to correct the image.

Analysis Unit

The analysis unit 24 analyzes the read image based on the read image data acquired by the reading unit 21. As shown in FIG. 4, the analysis unit 24 according to the present embodiment comprises a first specifying unit 31, a second specifying unit 32, a third specifying unit 33, a first analysis unit 34, a second analysis unit 35, a third analysis unit 36, a determination unit 37, and a recognition unit 38.

First Specifying Unit

The first specifying unit 31 specifies a presence region (hereinafter, a presence region P1) of the printed matter P from the inside of the read image indicated by the read image data. As shown in FIG. 2, the presence region P1 is a region in which the printed matter P is shown in the read image. The method of specifying the presence region P1 is not particularly limited. For example, a boundary of the largest rectangular shape or trapezoidal shape of the read image, or a shape close to these shapes may be recognized. In such a case, the region inside the recognized boundary is specified as the presence region P1.

Second Specifying Unit

The second specifying unit 32 specifies a presence region (hereinafter, a presence region P2) of the frame portion Pf in the printed matter P from the inside of the read image indicated by the read image data. As shown in FIG. 2, the presence region P2 is a region in which the frame portion Pf is shown in the read image. The method of specifying the presence region P2 is not particularly limited. For example, a square frame-shaped white region by a known edge detection method or the like in the presence region P1 specified by the first specifying unit 31 may be detected. In such a case, the detected region is specified as the presence region P2.

Third Specifying Unit

The third specifying unit 33 specifies a presence region (hereinafter, a presence region P3) of the captured image Pc in the printed matter P from the inside of the read image indicated by the read image data. As shown in FIG. 2, the presence region P3 is a region in which the captured image Pc is shown in the read image. In a case in which the presence region P3 is specified, for example, the presence region P2 specified by the second specifying unit 32, that is, the region in which the frame portion Pf is shown is excluded from the presence region P1 specified by the first specifying unit 31. Then, a region obtained by excluding the presence region P2 from the presence region P1 is specified as the presence region P3.

It should be noted that the second specifying unit 32 and the third specifying unit 33 may function complementarily. For example, the second specifying unit 32 may specify the presence region P2 in the presence region P1, and then the third specifying unit 33 may specify a region obtained by excluding the presence region P2 from the presence region P1 as the presence region P3. On the contrary, the third specifying unit 33 may specify a rectangular or trapezoidal region in the presence region P1 as the presence region P3, and then the second specifying unit 32 may specify a region obtained by excluding the presence region P3 from the presence region P1 as the presence region P2.

First Analysis Unit

The first analysis unit 34 analyzes a first content related to the reading (scanning) of the printed matter P based on the read image data. The first content is an evaluation content set for determining a quality of reading of the printed matter P, and is a content that can be quantitatively quantified and evaluated. An analysis result of the first content is changed according to the reading method, a reading condition, and the like of the printed matter P. In other words, the reading method, the reading condition, and the like can be reflected in the first content.

In a case of analyzing the first content, the first analysis unit 34 analyzes the first content by targeting at least a part of a region of the read image. Specifically, the first content may include, for example, a degree of shake in a case of reading the printed matter P, brightness during reading, whether a reading range is normal, a degree of partial omission of the image, and an amount of noise in the image. These contents can be specified by analyzing the presence region (that is, the presence region P2) of the frame portion Pf of the printed matter P in the read image. That is, the first analysis unit 34 may analyze the first content by targeting the presence region P2 specified by the second specifying unit 32. In such a case, it is possible to appropriately determine whether or not the printed matter P is normally read based on the information obtained from the presence region P2.

In addition, the first content may include, for example, a degree of distortion of the entire read image (whether or not the read image is a normal rectangular image by the trapezoidal correction), and the presence or absence of the reflected glare of the light source during reading. These contents can be specified by analyzing the presence region (that is, the presence region P1) of the printed matter P in the read image. That is, the first analysis unit 34 may analyze the first content by targeting the presence region P1 specified by the first specifying unit 31. In such a case, it is possible to appropriately determine whether or not the printed matter P is normally read based on the information obtained from the presence region P1.

It should be noted that the method of analyzing the first content described above is not particularly limited, and for example, an analysis method using a known image analysis technique (specifically, a technique of calculating and evaluating a feature amount of each part of the image or the like) can be used.

In addition, the analysis of the first content may be executed by targeting a region of the read image other than the presence region P2 of the frame portion Pf, for example, the presence region P3 of the captured image Pc, or may be executed by targeting both the presence region P2 of the frame portion Pf and the region other than the presence region P2. Further, the analysis of the first content may be executed by targeting a region of the read image other than the presence region P1 of the printed matter P, for example, a background region of the printed matter P, or may be executed by targeting both the presence region P1 of the printed matter P and the region other than the presence region P1.

Second Analysis Unit

The second analysis unit 35 analyzes a second content related to the image capturing of the captured image based on the read image data. The second content is an evaluation content set for determining a quality of the image capturing, and is a content that can be quantitatively quantified and evaluated. An analysis result of the second content is changed according to the image capturing method, an imaging condition, and the like of the captured image, in other words, the image capturing method, the imaging condition, and the like can be reflected in the second content.

The second content may include, for example, a degree of shake or blurriness in the captured image, brightness of the captured image, an exposure amount, a focal position, a position of the subject in the captured image (specifically, a positional relationship with the angle of view), a distance to the subject, an amount of noise in the captured image, and a signal-to-noise ratio (S/N ratio). In addition, in a case in which the subject in the captured image is a person, whether or not the eyes are closed, the presence or absence of the red eyes, an expression of a face, and the like may be included as the second content.

The second content described above can be specified by analyzing the presence region (that is, the presence region P3) of the captured image Pc in the read image. That is, the second analysis unit 35 may analyze the second content by targeting the presence region P3 specified by the third specifying unit 33. In such a case, it is possible to appropriately determine whether or not the captured image is normally captured based on the information obtained from the presence region P3.

It should be noted that the method of analyzing the second content described above is not particularly limited, and for example, a method using a known image analysis technique (specifically, a technique of detecting the subject in the image, a technique of calculating a feature amount of each part of the image and evaluating the image quality, or the like) can be used.

Third Analysis Unit

The third analysis unit 36 analyzes a third content related to the image quality of the captured image based on the read image data. The third content is an evaluation content set for determining the presence or absence of a possibility of improvement in the image quality of the captured image, and is a content that can be quantitatively quantified and evaluated. An analysis result of the third content is changed according to the image capturing method, an imaging condition, and the like of the captured image, in other words, the image capturing method, the imaging condition, and the like can be reflected in the third content.

The third content may include, for example, the tint of the subject in the captured image, a skin color and texture (sharpness) of a person in a case in which the subject is a person, and other items that can be improved by the image capturing method or image processing (correction). These contents can be specified by analyzing the presence region (that is, the presence region P3) of the captured image in the read image. That is, the third analysis unit 36 may analyze the third content by targeting the presence region P3 specified by the third specifying unit 33. In such a case, it is possible to appropriately determine whether or not there is the possibility of the improvement in the image quality of the captured image Pc based on the information obtained from the presence region P3.

It should be noted that the method of analyzing the third content described above is not particularly limited, and for example, a method using a known image analysis technique (specifically, a technique of detecting the subject in the image, a technique of calculating a feature amount of each part of the image and evaluating the image quality, or the like) can be used.

Determination Unit

The determination unit 37 determines the quality of reading of the printed matter P, in other words, whether or not the user fails to read the printed matter P, based on the analysis result of the first content by the first analysis unit 34. Specifically, the determination unit 37 compares the analysis result of the first content with a standard for the first content, and determines that reading is normally executed in a case in which the analysis result satisfies the standard. On the contrary, in a case in which the analysis result does not satisfy the standard, the determination unit 37 determines that reading fails. The standard for the first content is a threshold value set for determining the quality of reading of the printed matter P, specifically, is a standard value of the first content in a case in which the printed matter P is read normally.

It should be noted that the method of determining the standard for the first content is not particularly limited, but it is preferable to use an appropriate value to appropriately determine the quality of reading of the printed matter P. In addition, machine learning may be executed by using training data including the read image data obtained by reading the printed matter P and label data indicating the quality of reading of the printed matter P. In such a case, the standard described above can be set based on the learning result.

In addition, the determination unit 37 determines the quality of image capturing of the captured image, in other words, whether or not the user fails to capture the image printed on the printed matter P, based on the analysis result of the second content by the second analysis unit 35. Specifically, the determination unit 37 compares the analysis result of the second content with a standard for the second content, and determines that image capturing is normally executed in a case in which the analysis result satisfies the standard. On the contrary, in a case in which the analysis result does not satisfy the standard, the determination unit 37 determines that image capturing fails. The standard for the second content is a threshold value set for determining the quality of the image capturing, specifically, is a standard value of the second content in a case in which the captured image is normally captured.

It should be noted that the method of determining the standard for the second content is not particularly limited, but it is preferable to use an appropriate value to appropriately determine whether or not the captured image is normally captured. Further, machine learning may be executed by using training data including the image data of the captured image included in the printed matter P in the read image data of the printed matter P and label data indicating whether or not the captured image is normally captured. In such a case, the standard described above can be set based on the learning result.

In addition, the standard for the second content may be appropriately changed based on a condition or the like related to the creation of the printed matter P. For example, the standard may be set according to the performance of the camera (image capturing apparatus) used in a case of image capturing of the captured image. In addition, the standard may be set according to the performance of the printer that outputs the printed matter P, particularly, the color reproducibility.

Recognition Unit

The recognition unit 38 calculates the feature amount of the presence region P3 specified by the third specifying unit 33, that is, each part of the captured image Pc in the printed matter P, and recognizes the imaging scene of the captured image or the subject in the image based on the calculated feature amount. The imaging scene includes a time slot in which the captured image is captured, a location, a scene, a type of an event being executed during imaging, whether or not the captured image is a landscape image, and whether or not the captured image is a portrait image.

It should be noted that, as a technique of recognizing the imaging scene or the subject in the image, known scene recognition technique, subject detection technique, subject recognition technique, and the like can be used.

Correction Unit

The correction unit 25 executes image correction for the read image. In the present embodiment, the correction unit 25 corrects the read image according to the analysis result of the first content, the second content, or the third content. Specifically, in a case in which the analysis result of the first content does not satisfy the standard, the correction unit 25 executes the image correction according to the analysis result of the first content for the read image. The image correction according to the analysis result of the first content includes brightness correction, position correction (trimming), blurriness correction, shake correction, noise removal, and trapezoidal correction.

In addition, in a case in which the analysis result of the second content does not satisfy the standard, the correction unit 25 executes the image correction according to the analysis result of the second content for the read image, specifically, the presence region P3 in the read image. The image correction according to the analysis result of the second content includes brightness correction, color correction, white balance correction, blurriness correction, shake correction, noise removal, and the like. The color correction may include tint correction of changing the tint or removing a specific tint according to the light source during image capturing, tone correction of adjusting the tone of the image, and the like. In addition, the correction for the image in which a person is included as the subject in the image may include correction of red eyes, correction of a skin color or brightness, correction of modifying an expression of a face, correction of modifying a face with closed eyes to a face with open eyes, and the like.

In a case in which it is found that there is the possibility of the improvement in the image quality of the captured image by the analysis of the third content, the correction unit 25 executes the image correction according to the analysis result of the third content for the read image, specifically, the presence region P3 of the captured image in the read image. The image correction according to the analysis result of the third content is correction of improving the image quality, and may include, for example, the tint correction of changing the tint or removing the specific tint according to the light source during image capturing. In addition, in a case in which a person is included as the subject in the image, the correction of the skin color or brightness, for example, correction of brightening a part of the skin in a case in which the part of the skin is dark due to the influence of light may be included.

The read image is corrected by the correction unit 25 to acquire a correction image, which is a corrected read image. However, the image that is the correction target is not limited to the read image, and may be, for example, a sample image different from the read image. The sample image may be an image based on the image data stored in advance in the information processing terminal 10, or may be an image based on the image data acquired by the information processing terminal 10 from an external device via the network 12. In a case in which image correction is executed for the sample image, a correction sample image, that is, the corrected sample image is acquired.

It should be noted that the acquired correction image or correction sample image can be displayed on a screen of the information processing terminal 10, and the image data of the correction image or correction sample image can be stored in the storage 46 of the information processing terminal 10. The stored image data of the correction image or correction sample image may be reusable.

Further, in the present embodiment, the correction unit 25 automatically corrects the read image according to the analysis result of the first content, the second content, or the third content. In addition, in a case in which the reception unit 23 receives the correction operation of the user, the correction unit 25 corrects the read image according to the correction operation.

Further, in a case in which it is difficult to correct the read image according to the analysis result of the first content or the second content, for example, in a case in which it is difficult to correct the read image (particularly, the presence region P3 of the captured image in the printed matter P) to a normal image, the correction unit 25 corrects the sample image instead of the read image. Specifically, the subject having extremely low brightness is captured in the presence region P3 of the captured image, and the brightness of the subject cannot be modified to a normal value by the brightness correction. In such a case, the correction unit 25 selects the sample image in which the subject of the same type as the captured image is shown, and executes the brightness correction for the selected sample image.

Learning Unit

The learning unit 26 executes machine learning for a tendency of the support information used (viewed) by the user. Specifically, for example, in a case in which the user uses the support information (particularly, fourth support information described below) via the information processing terminal 10, information related to a usage history is accumulated in the storage unit 22 of the information processing terminal 10. The learning unit 26 executes machine learning by using the history information accumulated in the storage unit 22. In this manner, a learning result related to the use of the support information by the user can be obtained, specifically, it is possible to specify what kind of the support information the user prefers to use (view).

In addition, the learning unit 26 executes machine learning for a tendency of the image correction by the user. Specifically, in a case in which the user executes the correction operation of correcting the read image, information related to an execution history is accumulated in the storage unit 22 of the information processing terminal 10. The learning unit 26 executes machine learning by using the history information accumulated in the storage unit 22. As a result, a learning result related to the correction operation by the user can be obtained, specifically, what kind of the image correction the user prefers to execute can be specified.

It should be noted that the machine learning described above is not limited to a case in which the machine learning is executed by the learning unit 26 of the information processing terminal 10, and may be executed by an apparatus other than the information processing terminal 10, for example, a server that can communicate with the information processing terminal 10. In such a case, the information processing terminal 10 requests the other apparatus described above to execute the machine learning, and uses a result of the executed machine learning via communication with the other apparatus.

Search Unit

The search unit 27 searches for the support information corresponding to the analysis result of the analysis unit 24. Specifically, in a case in which the determination unit 37 determines that the analysis result of the first content by the first analysis unit 34 does not satisfy the standard for the first content, the search unit 27 searches for first support information related to the reading method of the printed matter P. The first support information is information including advice on the reading method of the printed matter, specifically, is information on a Web page on which the advice is posted.

In a case in which the search unit 27 searches for the first support information, the search unit 27 searches for the first support information corresponding to the analysis result of the first content. Specifically, a correspondence relationship between each of the plurality of first contents described above and a URL of the Web page that is the first support information (hereinafter, referred to as the URL of the first support information) is stored in the storage unit 22 as table data in advance. The search unit 27 refers to the table data, and specifies the URL of the first support information corresponding to the analysis result of the first content that does not satisfy the standard. For example, in a case in which the shake of the read image does not satisfy the standard, the search unit 27 specifies the URL of the first support information related to the shake during image reading.

It should be noted that the plurality of first contents include a content that can be analyzed by targeting the presence region P1 of the printed matter P in the read image, and a content that can be analyzed by targeting the presence region P2 of the frame portion Pf of the printed matter P in the read image. In addition to these, for example, a content that can be analyzed by targeting the presence region P3 of the captured image Pc in the read image may be included as the first content.

In addition, in a case in which the determination unit 37 determines that the analysis result of the second content by the second analysis unit 35 does not satisfy the standard for the second content, the search unit 27 searches for second support information related to the image capturing method of the captured image based on the analysis result of the second content. The second support information is information including advice on the image capturing method of the captured image, specifically, is information on a Web page on which the advice is posted.

In a case in which the search unit 27 searches for the second support information, the search unit 27 searches for the second support information corresponding to the analysis result of the second content. Specifically, a correspondence relationship between each of the plurality of second contents described above and a URL of the Web page that is the second support information (hereinafter, referred to as the URL of the second support information) is stored in the storage unit 22 as table data in advance. The search unit 27 refers to the table data, and specifies the URL of the second support information corresponding to the analysis result of the second content that does not satisfy the standard. For example, in a case in which the brightness of the read image does not satisfy the standard, the search unit 27 specifies the URL of the second support information related to the brightness during image capturing.

In addition, in the present embodiment, in a case of specifying the URL of the second support information, the imaging scene of the captured image recognized by the recognition unit 38 or the subject in the image may be taken into consideration. That is, the search unit 27 may specify the URL of the second support information corresponding to the imaging scene of the captured image or the subject in the image in the second support information corresponding to the analysis result of the second content. For example, in a case in which the subject of the captured image is a pet, the URL of the second support information related to the image capturing of the pet may be specified.

In addition, in a case in which the third analysis unit 36 analyzes the third content, the search unit 27 searches for third support information related to the image capturing method or the correction method of the captured image based on the analysis result of the third content. The third support information is information including advice on the image capturing method or the correction method of the captured image in which the image quality of the captured image can be improved, specifically, is information on a Web page on which the advice is posted.

In a case in which the search unit 27 searches for the third support information, the search unit 27 searches for the third support information corresponding to the analysis result of the third content. Specifically, a correspondence relationship between each of the plurality of third contents and a URL of the Web page that is the third support information (hereinafter, referred to as the URL of the third support information) is stored in the storage unit 22 as table data in advance. The search unit 27 refers to the table data, and specifies the URL of the third support information corresponding to the analysis result of each third content. For example, the search unit 27 specifies the URL of the third support information related to the image correction (specifically, color correction or the like) of improving the image quality of the captured image. Alternatively, the search unit 27 specifies the URL of the third support information related to the image correction (specifically, color correction or the like) of improving the image quality of the captured image. Alternatively, the search unit 27 specifies the URL of the third support information related to the image capturing method of capturing the image satisfactorily.

In addition, in a case in which the reception unit 23 receives the correction operation of the user for the presence region P3 of the captured image in the printed matter P in the read image, the search unit 27 searches for fourth support information related to the image correction. The fourth support information is information including advice on image correction according to the correction operation of the user, specifically, is information on a Web page on which the advice is posted.

In a case in which the search unit 27 searches for the fourth support information, the search unit 27 searches for the fourth support information corresponding to the correction operation of the user. Specifically, a correspondence relationship between various correction contents and a URL of the Web page that is the fourth support information (hereinafter, referred to as the URL of the fourth support information) is stored in the storage unit 22 as table data in advance. The search unit 27 refers to the table data, and specifies the URL of the fourth support information corresponding to the correction operation of the user. For example, in a case in which the user executes a position adjustment operation as the correction operation, the search unit 27 specifies the URL of the fourth support information related to the position adjustment correction.

In addition, in a case in which the user has used the fourth support information a plurality of times, the learning unit 26 may execute the machine learning based on the usage history of the fourth support information by the user. In addition, in a case in which the user has executed the correction operation a plurality of times so far, the learning unit 26 may execute the machine learning based on the execution history of the correction operation by the user. Then, in a case in which the learning unit 26 executes the machine learning, the search unit 27 may search for the fourth support information based on the learning result of the machine learning described above. Specifically, the search unit 27 may specify the URL of the fourth support information according to a tendency of the fourth support information frequently used by the user or a tendency of the correction operation frequently executed by the user.

Acquisition Unit

The acquisition unit 28 acquires the support information based on the analysis result of the analysis unit 24. An aspect of acquiring the support information includes creating the support information by processing existing information, obtaining existing support information from the external device (for example, downloading the existing support information via the network), reading out the support information stored in the storage or the memory, and the like. In addition, obtaining information related to a location or a transmission source of the support information can also be included in one aspect of acquiring the support information.

In the present embodiment, the acquisition unit 28 acquires the support information searched by the search unit 27 from the information provision server 14 via the network 12. Specifically, the acquisition unit 28 accesses the information provision server 14 based on the URL specified by the search unit 27 from the analysis result of the analysis unit 24, and receives the information on the Web page stored in the URL from the information provision server 14.

In the present embodiment, as shown in FIG. 4, the acquisition unit 28 comprises a first acquisition unit 51, a second acquisition unit 52, a third acquisition unit 53, and a fourth acquisition unit 54.

First Acquisition Unit

The first acquisition unit 51 acquires the first support information based on the analysis result of the first content by the first analysis unit 34. Specifically, the first acquisition unit 51 accesses the information provision server 14 based on the URL of the first support information specified by the search unit 27 from the analysis result of the first content, and receives (downloads) the information on the Web page, which is the first support information, from the information provision server 14.

Second Acquisition Unit

The second acquisition unit 52 acquires the second support information based on the analysis result of the second content by the second analysis unit 35. Specifically, the second acquisition unit 52 accesses the information provision server 14 based on the URL of the second support information specified by the search unit 27 from the analysis result of the second content, and receives (downloads) the information on the Web page, which is the second support information, from the information provision server 14.

Third Acquisition Unit

The third acquisition unit 53 acquires the third support information based on the analysis result of the third content by the third analysis unit 36. Specifically, the third acquisition unit 53 accesses the information provision server 14 based on the URL of the third support information specified by the search unit 27 from the analysis result of the third content, and receives (downloads) the information on the Web page, which is the third support information, from the information provision server 14.

Fourth Acquisition Unit

The fourth acquisition unit 54 acquires the fourth support information in a case in which the reception unit 23 receives the correction operation of the user for a predetermined region of the read image (specifically, the presence region P3 of the captured image. Specifically, the fourth acquisition unit 54 accesses the information provision server 14 based on the URL of the fourth support information specified by the search unit 27 according to the correction operation of the user, and receives (downloads) the information on the Web page, which is the fourth support information, from the information provision server 14.

Provision Unit

Figure 5:
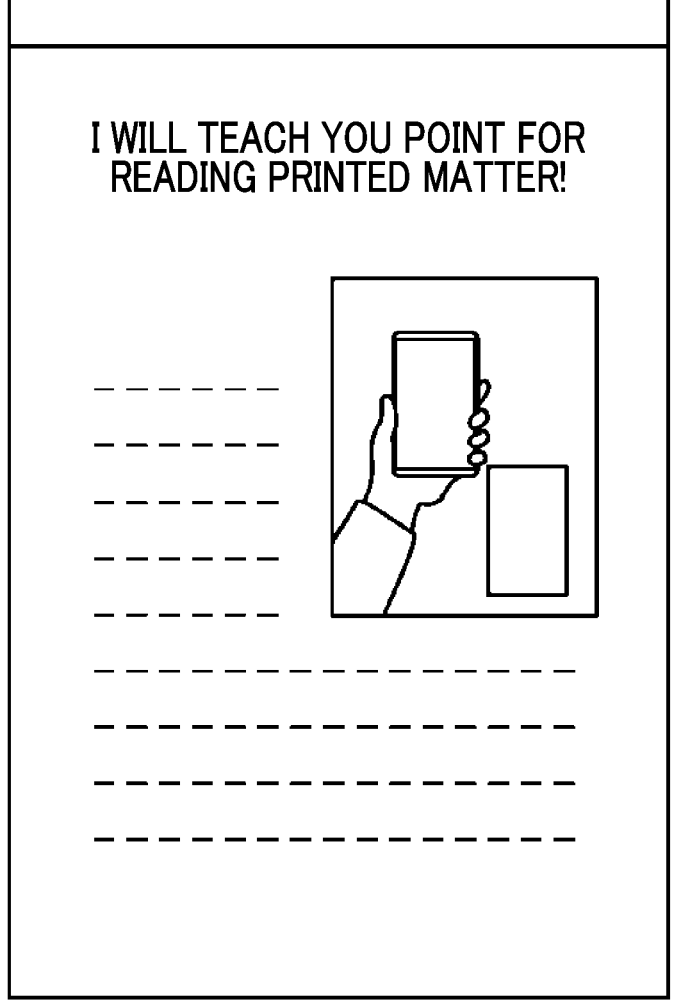
FIG. 5 is a diagram showing an example of a screen on which first support information is displayed.
Figure 6:
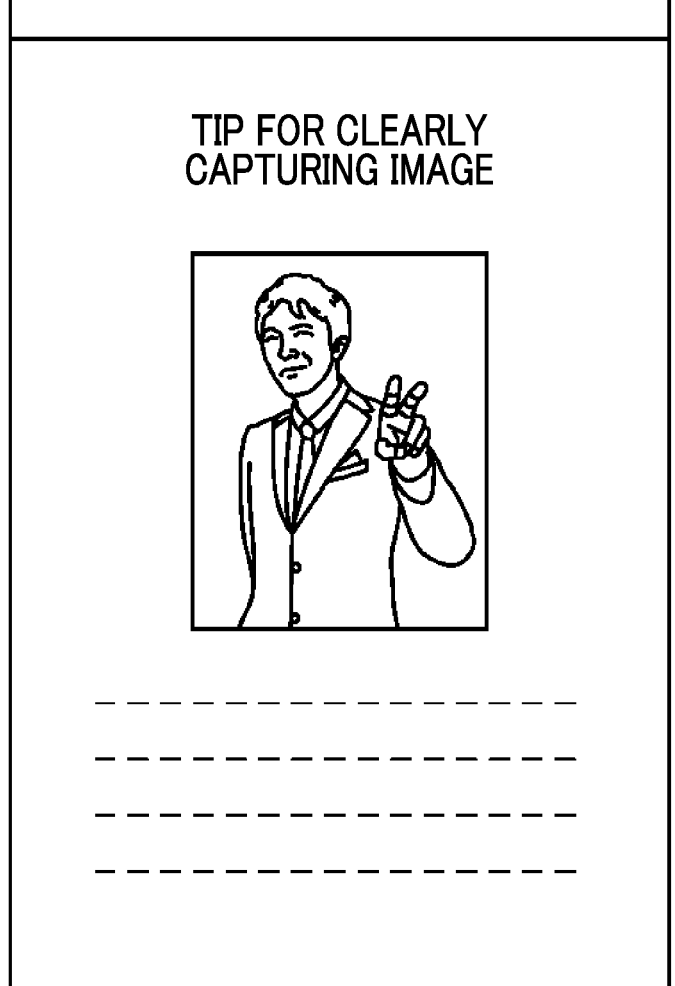
FIG. 6 is a diagram showing an example of a screen on which second support information is displayed.
Figure 7:
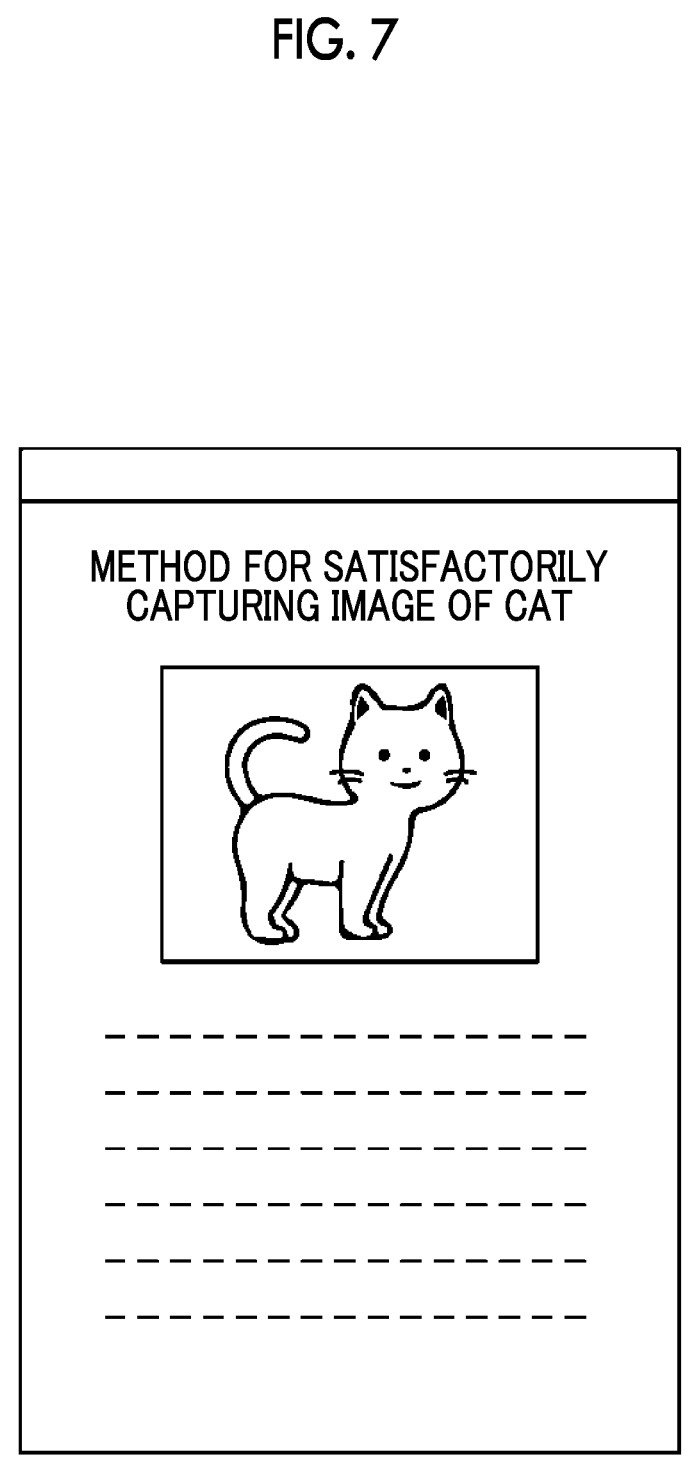

The provision unit 29 provides the support information acquired by the acquisition unit 28 to the user by displaying the support information on the screen of the information processing terminal 10. Specifically, in a case in which the acquisition unit 28 acquires the first support information, the second support information, or the third support information, the provision unit 29 displays the acquired support information as shown in FIGS. 5 to 7. As a result, the user can check and use the acquired support information, specifically, that is, the Web page on which the advice is posted.

In addition, in some cases, the acquisition unit 28 can acquire a plurality of pieces of the first support information. For example, in a case in which the analysis result of each of the two or more first contents does not satisfy the standard, the acquisition unit 28 acquires the first support information for each first content. In such a case, a priority degree may be set for each of the plurality of pieces of the first support information, and the first support information having a higher priority degree may be provided with priority. Here, the priority degree may be set according to the magnitude of a deviation (difference) between the analysis result and the standard for the first content of which the analysis result does not satisfy the standard. In such a case, the priority degree may be set to be higher as the deviation is larger.

Similarly, in a case in which the analysis result of each of the two or more second contents does not satisfy the standard, the acquisition unit 28 acquires the second support information for each second content, and as a result, a plurality of pieces of the second support information are obtained. In such a case, a priority degree may be set for each of pieces of the second support information, and the second support information having a higher priority degree may be provided with priority. The priority degree may be set according to the magnitude of a deviation (difference) between the analysis result and the standard for the second content of which the analysis result does not satisfy the standard, and the priority degree is set to be higher as the deviation is larger.

Figure 8:
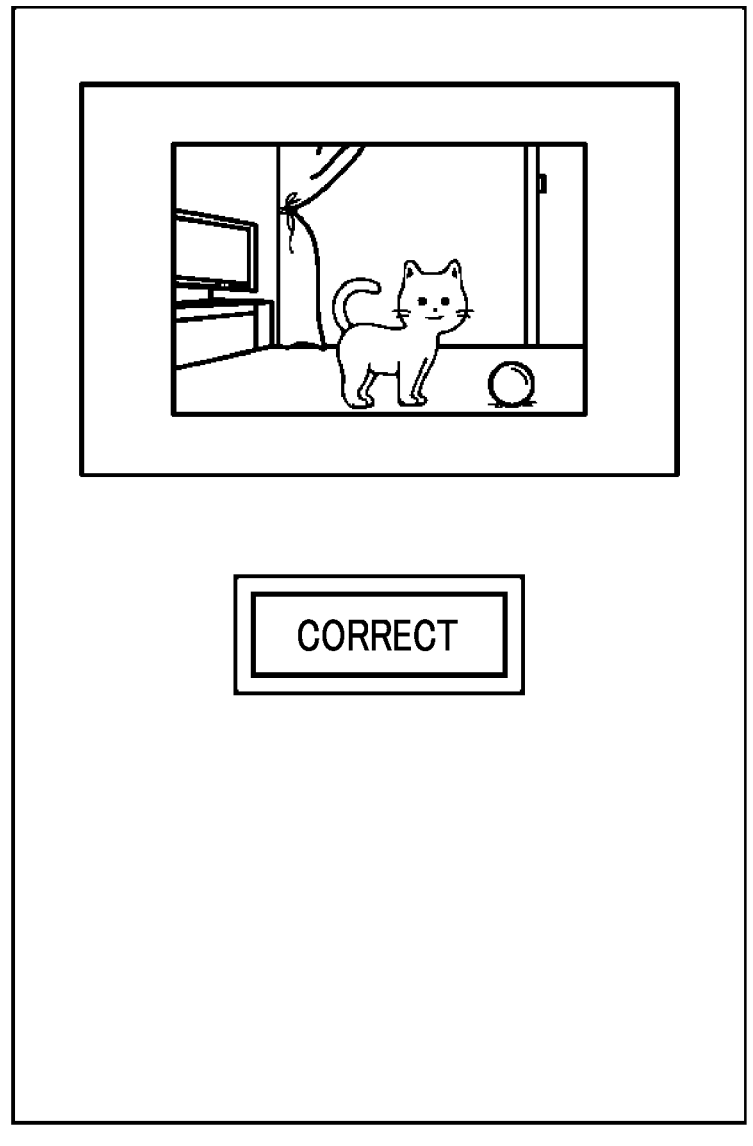
FIG. 8 is a diagram showing an example of a screen on which a correction image is displayed.

In addition, in a case of providing the support information, as shown in FIG. 8, the provision unit 29 may display the read image corrected by the correction unit 25 according to the analysis result of the first content, the second content, or the third content, that is the correction image. In addition, in a case in which it is difficult to correct the read image according to the analysis result of the first content or the second content, the sample image corrected by the correction unit 25 according to the analysis result of the first content or the second content, that is, the correction sample image may be displayed instead of the correction image.

Figure 9:
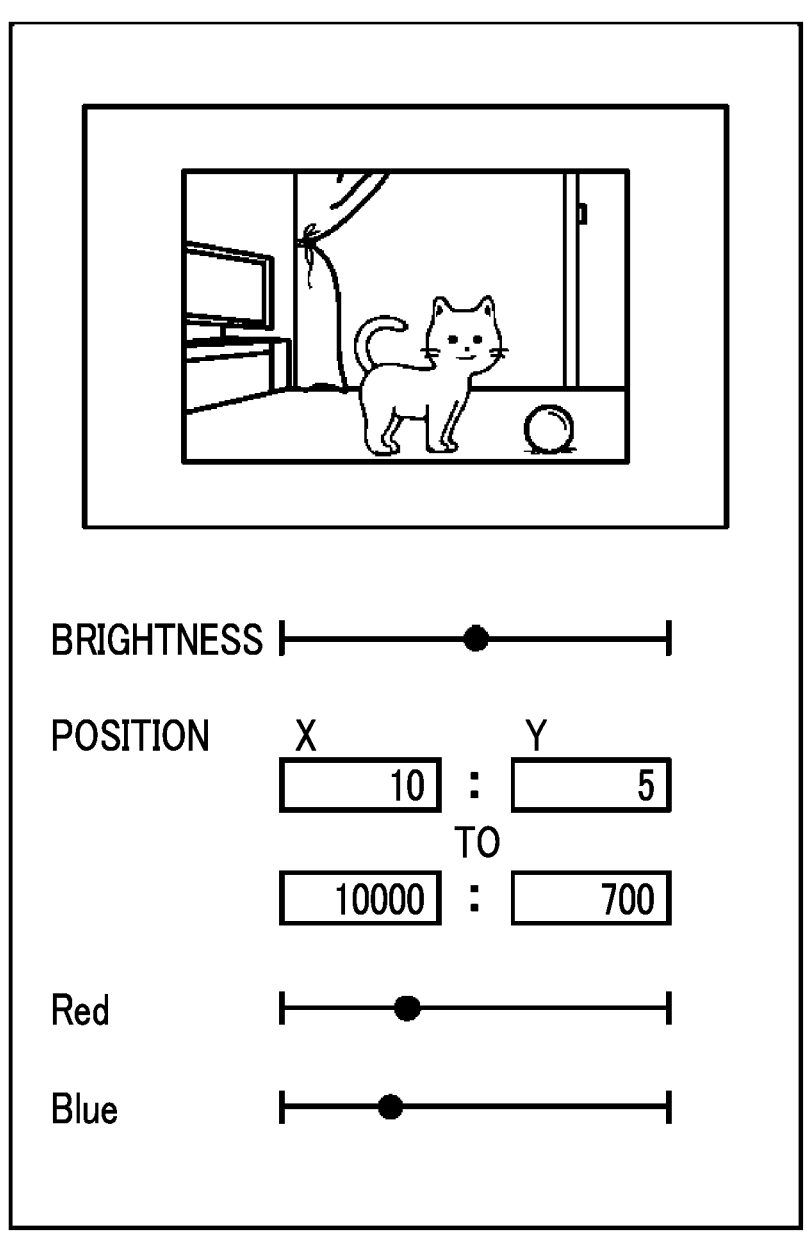
FIG. 9 is a diagram showing an example of a reception screen for a correction operation for the read image.

In addition, the provision unit 29 may display the read image before the correction together with the correction image such that an effect of the image correction can be easily visually recognized. In such a case, the read image before the correction may be displayed in a state in which the correction can be executed by the user. That is, it may be possible to receive the correction operation by the user via the screen on which the read image before the correction is displayed. For example, as shown in FIG. 8, a correction button may be provided on a display screen of the correction image, the screen may be switched to a correction reception screen shown in FIG. 9 by pressing the correction button, and the correction operation for the read image may be performed via the screen.

Figure 10:
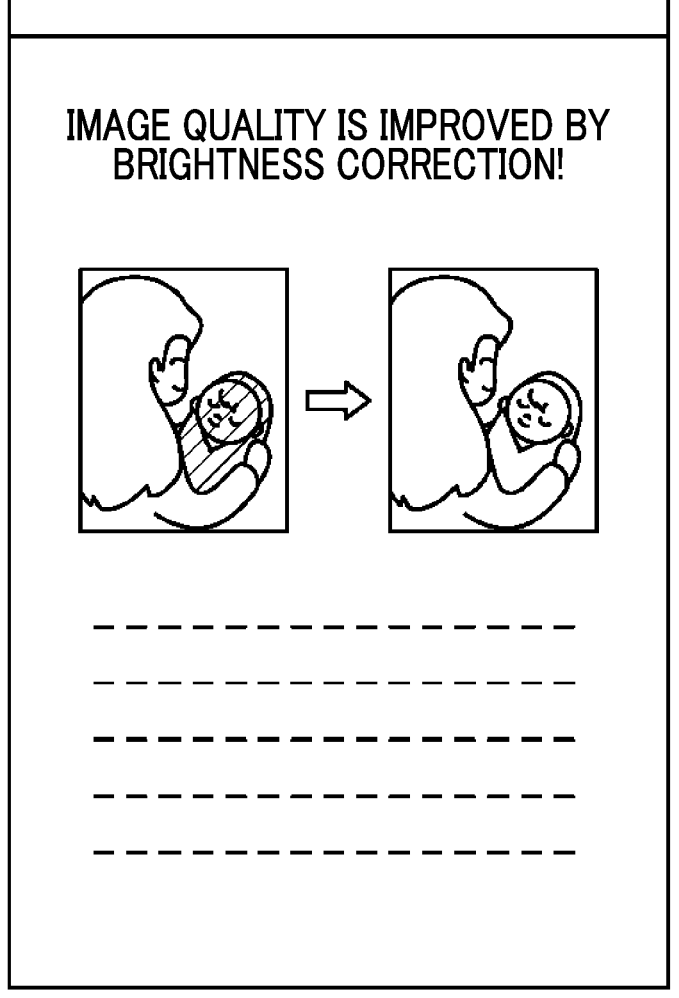
FIG. 10 is a diagram showing an example of a screen on which fourth support information is displayed.

Then, in a case in which the user who checks the correction image executes the correction operation for the purpose of executing the image correction different from the correction of the correction image for the read image, the provision unit 29 provides the fourth support information corresponding to the correction operation to the user, as shown in FIG. 10. A specific example will be described. For example, in a case in which the correction unit 25 creates the correction image by executing the correction of setting the brightness to +3 for the read image, the user executes the correction operation for the read image only for the purpose of the position adjustment (trimming) without changing the brightness. In such a case, the acquisition unit 28 acquires the fourth support information related to the position adjustment, and the provision unit 29 provides the acquired fourth support information to the user.

In addition, in a case in which the learning unit 26 executes the machine learning based on the usage history of the fourth support information or the execution history of the correction operation by the user, the search unit 27 searches for the fourth support information based on the learning result of the machine learning, and the acquisition unit 28 acquires the searched fourth support information. A specific example will be described. In a case in which the user frequently executes the position adjustment correction operation, the acquisition unit 28 acquires the fourth support information related to the position adjustment, and the provision unit 29 provides the acquired fourth support information to the user. Further, in this case, the provision unit 29 may also display the read image for which the correction (position adjustment in the example described above) corresponding to the fourth support information is executed, that is, the correction image.

About Operation Example of Image Analysis Apparatus According to Embodiment of Present Invention Next, as an operation example of the image analysis apparatus according to the present embodiment, an image analysis flow by the information processing terminal 10 constituting the image analysis apparatus will be described. In the image analysis flow described below, an image analysis method according to the embodiment of the present invention is used. That is, each step in the image analysis flow described below corresponds to a component of the image analysis method according to the embodiment of the present invention.

It should be noted that the following flow is merely an example, and within a range not departing from the gist of the present invention, some steps in the flow may be deleted, new steps may be added to the flow, or the execution order of the two steps in the flow may be exchanged.

Figure 11:
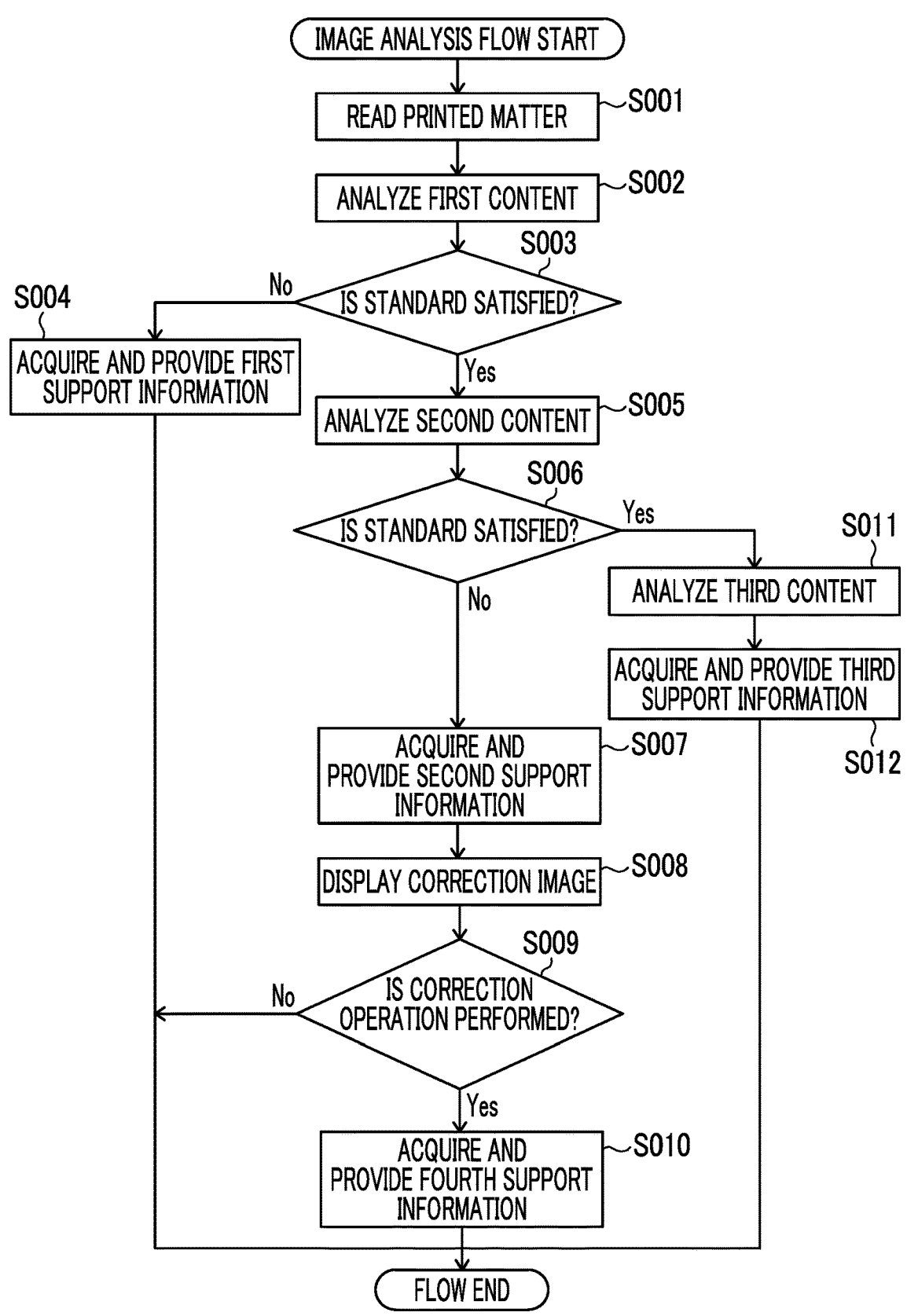
FIG. 11 is a diagram showing an image analysis flow according to the embodiment of the present invention.

Each step in the image analysis flow according to the present embodiment is executed by the processor 41 provided in the information processing terminal 10 by a procedure shown in FIG. 11. That is, in each step in the image analysis flow, the processor 41 executes the process corresponding to each step according to the program stored in the information processing terminal 10 including the scan application.

In a case in which the image analysis flow is started, the user acquires the printed matter P on which the captured image is printed. Specifically, the user captures the image of the subject by using the printer-equipped camera 16, and prints the captured image on the instant color film by using the printer-equipped camera 16.

The image analysis flow can be started in a case in which the user activates the scan application on the information processing terminal 10. In the image analysis flow, first, the processor 41 controls the camera of the information processing terminal 10 to read the printed matter P, and acquires the image data of the read image (S001).

Next, the processor 41 analyzes the first content related to the reading of the printed matter P based on the read image data (S002). More specifically, in the analysis of the first content, the processor 41 specifies the presence region P1 of the printed matter P and the presence region P2 of the frame portion Pf in the printed matter P from the inside of the read image.

Then, the processor 41 analyzes the first content by targeting the specified presence region P1 and presence region P2. Specifically, in the read image, the presence region P1 of the printed matter P including the frame portion Pf is targeted, and the degree of shake or blurriness, the brightness, the presence or absence of the reflected glare of the light source, the appropriateness of the reading range, and the like in the entire region of the printed matter P including the frame portion Pf are analyzed. In addition, the degree of shake, the brightness, the degree of partial omission of the image, the amount of noise in the image, and the like during reading of the printed matter P are analyzed by targeting the frame portion Pf.

Then, the processor 41 determines whether or not the analysis result in step S002 satisfies the standard for the first content (S003). In a case in which the analysis result satisfies the standard, the process proceeds to step S005.

On the other hand, in a case in which the analysis result does not satisfy the standard, that is, in a case in which the user fails to read the printed matter P, the processor 41 acquires the first support information based on the analysis result of the first content, and provides the acquired first support information to the user (S004). More specifically, the processor 41 searches for the first support information corresponding to the analysis result of the first content, specifically, specifies the URL of the first support information corresponding to the analysis result of the first content that does not satisfy the standard. Then, the processor 41 receives the first support information stored in the specified URL from the information provision server 14, and displays the received first support information on the screen of the information processing terminal 10.

The first support information provided in step S004 is, for example, the information on the Web page on which the advice on the reading method of the printed matter is posted. The user can view the Web page, which is the first support information, to obtain the advice on the reading method of the printed matter, particularly the information related to the first content of which the analysis result does not satisfy the standard. As a result, the user can refer to the obtained advice in a case of reading the printed matter (strictly speaking, a printed matter different from the printed matter read in S001) from the next time onward.

On the other hand, in a case in which the process transitions from step S003 to step S005, the processor 41 analyzes the second content related to the image capturing of the captured image based on the read image data. More specifically, in the analysis of the second content, the processor 41 specifies the presence region P3 of the captured image Pc in the printed matter P from the inside of the read image. Then, the processor 41 analyzes the second content by targeting the specified presence region P3. Specifically, the degree of shake or blurriness in the captured image Pc, the brightness, the position of the subject in the captured image, the distance to the subject, the amount of noise in the image, and the like are analyzed. In addition, in a case in which the subject in the captured image is a person, the processor 41 may analyze whether or not the eyes of the person are closed, the presence or absence of the red eyes, the expression of the face, and the like as the second content.

Next, the processor 41 determines whether or not the analysis result in step S005 satisfies the standard for the second content (S006). In a case in which the analysis result satisfies the standard, the process proceeds to step S011.

On the other hand, in a case in which the analysis result does not satisfy the standard, that is, in a case in which the user fails to capture the image, the processor 41 acquires the second support information based on the analysis result of the second content, and provides the acquired second support information to the user (S007). More specifically, the processor 41 searches for the second support information corresponding to the analysis result of the second content, specifically, specifies the URL of the second support information corresponding to the analysis result of the second content that does not satisfy the standard. Then, the processor 41 receives the second support information stored in the specified URL from the information provision server 14, and displays the received second support information on the screen of the information processing terminal 10.

The second support information provided in step S007 is, for example, the information on the Web page on which the advice on the image capturing method is posted. The user can view the Web page, which is the second support information, to obtain the advice on the image capturing method, particularly the information related to the second content of which the analysis result does not satisfy the standard. As a result, the user can refer to the obtained advice in a case of capturing the image (strictly speaking, an image different from the image printed on the printed matter P read in S001) from the next time onward.

In the image analysis flow, the processor 41 can specify the imaging scene of the captured image or the subject in the image from the presence region P3 of the captured image Pc. In such a case, the processor 41 may provide the second support information corresponding to the specified imaging scene or subject to the user. With such a configuration, the user can obtain the advice in a case in which the image is captured in the same imaging scene as the image captured by the user or the advice in a case in which the same subject as the image captured by the user is captured. As a result, it is easier for the user to grasp the improvement points of image capturing.

In addition, in a case of providing the second support information, the processor 41 corrects the read image according to the analysis result of each of the first content or the second content to acquire the correction image, and displays the correction image on the screen of the information processing terminal 10 (S008). By displaying the correction image in this way, the user can check the effect of the image correction by looking at the correction image obtained by correcting the read image in a case in which reading or image capturing of the printed matter fails.

It should be noted that, in a case in which it is difficult to correct the read image according to the analysis result of the first content or the second content, the processor 41 displays the correction sample image obtained by executing the image correction for the sample image on the screen of the information processing terminal 10 instead of the correction image.

In addition, the processor 41 displays the read image before the correction together with the correction image or the correction sample image, or on a different screen from the correction image or the correction sample image. In this case, the processor 41 displays the read image before the correction in a state in which the user can correct the image. That is, the processor 41 can receive the correction operation by the user via the screen on which the read image before the correction is displayed (for example, the screen shown in FIG. 9).

Then, in a case in which the processor 41 receives the correction operation (S009), the processor 41 acquires the fourth support information related to the image correction, and provides the acquired fourth support information to the user (S010). More specifically, the processor 41 specifies the URL of the fourth support information corresponding to the received correction operation. Then, the processor 41 receives the fourth support information stored in the specified URL from the information provision server 14, and displays the received fourth support information on the screen of the information processing terminal 10.

The fourth support information provided in step S010 is, for example, the information on the Web page on which the advice on the image correction is posted. The user can view the Web page, which is the fourth support information, to obtain the advice on the image correction. As a result, the user can refer to the obtained advice in a case of subsequently correcting the read image.

In the image analysis flow, the processor 41 can provide the fourth support information in consideration of a preference of the user and the like. Specifically, the processor 41 executes the machine learning based on the usage history of the fourth support information by the user or the execution history of the correction operation by the user. Then, the processor 41 can select the fourth support information based on the learning result of the machine learning to provide the selected fourth support information to the user. As a result, it is possible to provide the fourth support information selected in consideration of the tendency of the image correction by the user and the like to the user.

On the other hand, in a case in which the process transitions from step S006 to step S011, the processor 41 analyzes the third content related to the image quality of the captured image based on the read image data. More specifically, the processor 41 analyzes the possibility of the improvement in the image quality by the image correction or the image capturing method by targeting the presence region P3 of the captured image of the printed matter P in the read image. The possibility of the improvement in the image quality by the image correction can be specified based on the tint of the subject in the captured image, the skin color and texture (sharpness) of a person in a case in which the subject is a person, other items that can be improved by the image correction. The possibility of the improvement in the image quality by the image capturing method can be specified based on the brightness of each part of the captured image, the type of the subject in the captured image, and the like.

After the third content is analyzed, the processor 41 acquires the third support information related to the image capturing method or the correction method of the captured image based on the analysis result of the third content, and provides the acquired third support information to the user (S012). More specifically, the processor 41 specifies the URL of the third support information corresponding to the analysis result of the third content, receives the third support information stored in the specified URL from the information provision server 14, and displays the third support information on the screen of the information processing terminal 10.

The third support information provided in step S012 is, for example, the information on the Web page on which the advice on the image capturing method or the image correction method for improving the image quality of the captured image is posted. The user can view the Web page, which is the third support information, to obtain the advice on the image quality improvement. As a result, the user can refer to the obtained advice in a scene of image capturing or correcting the captured image from the next time onward.

In addition, in a case of providing the third support information, the processor 41 may correct the read image according to the analysis result (strictly, the analysis result related to the image correction) of the third content to display the correction image on the screen of the information processing terminal 10. As a result, the user can check the effect of the image correction by looking at the read image, that is, the correction image in a case of the correction according to the analysis result of the third content.

The image analysis flow is terminated by terminating the series of steps described above. The image analysis flow is executed every time the user activates the scan application of the information processing terminal 10 to read the printed matter P. However, the present invention is not limited to this. In a case in which the printed matter P is read, an inquiry about the intention of the user regarding the necessity of the execution of the image analysis flow is made, and the image analysis flow may be executed only in a case in which the user requests the execution of the image analysis flow.

About Effectiveness of Present Embodiment

In the present embodiment, as described above, the printed matter P on which the captured image is printed is read, and the first content related to the reading of the printed matter P is analyzed based on the read image data. Then, the quality of reading of the printed matter P is determined from the analysis result of the first content, and in a case in which the user fails to read the printed matter P, the first support information related to the reading method of the printed matter is acquired and provided to the user. As a result, the user can refer to the first support information in a case of reading the new printed matter from the next time onward, and can suppress the repetition of the same failure in a case of reading the printed matter from the next time onward.

In addition, in the present embodiment, the second content related to the image capturing of the image printed on the printed matter P is analyzed based on the read image data described above. Then, the quality of image capturing is determined from the analysis result of the second content, and in a case in which the user fails to capture the image, the second support information related to the image capturing method is acquired and provided to the user. As a result, the user can refer to the second support information in a case of capturing the image from the next time onward, and can suppress the repetition of the same failure in a case of capturing the image from the next time onward.

In addition, in the present embodiment, the read image is corrected according to the analysis result of the first content or the second content to acquire the correction image, and the correction image is displayed on the screen of the information processing terminal 10. As a result, for example, the user can check the effect of the image correction by looking at the correction image obtained by correcting the read image in a case in which reading or image capturing of the printed matter fails.

In addition, in the present embodiment, based on the read image data described above, the third content related to the image quality of the captured image is analyzed, and the presence or absence of the possibility of the improvement in the image quality is determined. Then, in a case in which there is the possibility of the improvement in the image quality, the third support information related to the image capturing method or the correction method is acquired and provided to the user. As a result, in a case in which the user succeeds in reading the printed matter and capturing the image, the user can further improve the image quality of the captured image with reference to the third support information. In addition, the user can execute the image capturing by a more suitable method from the next time onward by referring to the third support information related to the image capturing.

In addition, in the present embodiment, as the first, second, and third support information, the information on the Web page on which the advice on the reading method or the image capturing method of the printed matter is posted is provided. In this way, by utilizing the Web page, which is the existing information, the first, second, and third support information can be efficiently provided to the user.

The effect described above will be described in detail. In the related art, the information, such as the advice on image capturing or the URL of the Web page on which the advice is posted, is described in an instruction manual or a booklet of the camera (for example, the printer-equipped camera 16). However, it is difficult to find useful information for the user from the instruction manual or the booklet. More specifically, even in a case in which the user fails to read the printed matter or to capture the image, it is difficult for the user to specify a cause of the failure by himself/herself. Further, it is difficult for the user to find the information for revising the failure from the instruction manual or the booklet.

On the other hand, in the present embodiment, in a case in which the user fails to read the printed matter or to capture the image, the cause of the failure can be easily recognized. In addition, the user can more easily obtain the support information for revising the failure or the support information for improving the image quality of the captured image.

In addition, in the present embodiment, in a case in which the user executes the correction operation to correct the read image, the fourth support information corresponding to the correction operation of the user is acquired and provided to the user as the information related to the image correction. As a result, the user can obtain the advice on the image correction executed by the user, and can refer to the advice in the image correction from the next time onward.

OTHER EMBODIMENTS

The embodiment described above is a specific example given for an easy-to-understand description of the image analysis apparatus, the image analysis method, the program, and the recording medium according to the embodiment of the present invention, and is merely an example, and other embodiments can be conceivable.

In the embodiment described above, each of the first to fourth support information is the information acquired via the network, but the present invention is not limited to this. For example, the first to fourth support information may be accumulated in the information processing terminal 10 as a database. In such a case, the support information acquired (specifically, extracted) according to the analysis result by the analysis unit 24 may be provided to the user from the database described above.

In addition, the database of the support information may be constructed not on the information processing terminal 10 but on a server for a cloud service. In such a case, the image analysis apparatus consisting of the information processing terminal 10 may access the server, may read out and acquire (download) the support information extracted according to the analysis result by the analysis unit 24, and may provide the acquired support information to the user.

In addition, in a case in which the scan application is installed in the information processing terminal 10, a usage manual of the scan application including the first to fourth support information may be stored in the information processing terminal 10. In such a case, the support information acquired according to the analysis result by the analysis unit 24 may be provided to the user from the manual described above.

In addition, in the embodiment described above, the first content related to the reading of the printed matter is analyzed based on the image data of the read image. Then, in a case in which the analysis result of the first content satisfies the standard for the first content, the second content related to the image capturing of the captured image is analyzed in the subsequent steps. Then, in a case in which the analysis result of the second content satisfies the standard for the second content, the third content related to the image quality of the captured image is analyzed in the subsequent step. However, the order, the procedure, and the like for analyzing the first content, the second content, and the third content are not particularly limited. For example, the second content may be analyzed first, and then the first content and the third content may be analyzed. In addition, the first content, the second content, and the third content may be analyzed in parallel.

In addition, in the embodiment described above, the first support information is the information on the Web page on which the advice on the reading method of the printed matter is posted. However, the present invention is not limited to this, and for example, the first support information may include code information for connection to a provision source of the support information related to the reading method of the printed matter, specifically, an URL for displaying the Web page described above. Alternatively, the first support information may include information prompting the re-reading of the printed matter.

In addition, in the embodiment described above, the second support information is the information on the Web page on which the advice on the image capturing method of the captured image is posted. However, the present invention is not limited to this, and for example, the second support information may include code information for connection to a provision source of the support information related to the image capturing method of the captured image, specifically, an URL for displaying the Web page described above. Alternatively, the second support information may include information prompting the re-capturing of the captured image.

In addition, in the embodiment described above, the second content related to the image capturing of the captured image is analyzed, and the second support information related to the image capturing method is acquired based on the analysis result. However, the present invention is not limited to this, and the first support information may be acquired based on the analysis result of the second content related to the image capturing of the captured image. Specifically, for example, the degree of partial omission in the captured image Pc (that is, the presence region P3) in the read image, the presence or absence of reflected glare of the light source, and the degree of distortion of the captured image Pc may be analyzed as the second contents. Then, the information for satisfactorily reading the captured image Pc of the printed matter P may be acquired based on these analysis results. According to such a procedure, it is possible to acquire the first support information related to the reading method of the printed matter based on the analysis result of the second content.

In addition, in the embodiment described above, the first support information is acquired based on the analysis result of the first content, and the second support information is acquired based on the analysis result of the second content. However, the present invention is not limited to this. Each of the first support information and the second support information may be acquired based on the analysis results of both the first content and the second content.

Specifically, by targeting the presence region P1 of the printed matter P including the frame portion Pf in the read image, the degree of the shake in the entire region of the printed matter P including the frame portion Pf is analyzed as the first content. In addition, by targeting the presence region P3 of the captured image Pc in the read image, the degree of shake in the captured image Pc is analyzed as the second content. Thereafter, the analysis results of the first content and the second content are compared to determine whether the cause of the shake is the reading of the printed matter P or the image capturing of the captured image Pc. Any of the first support information or the second support information need only be acquired based on such a determination result. Specifically, in a case in which the degree of blurriness analyzed as the first content and the degree of blurriness analyzed as the second content are the same degree, the first support information need only be acquired. On the other hand, in a case in which the degree of blurriness analyzed as the first content is small and the degree of blurriness analyzed as the second content is large, the second support information need only be acquired.

In addition, while the first support information and the second support information are the support information related to the use of the read image, the first support information and the second support information may be information other than the information described above. That is, the first support information and the second support information may be support information related to an item different from either the reading method of the printed matter or the image capturing method of the captured image, for example, information related to a creation method of the printed matter.

Specifically, for example, based on the presence region P3 of the captured image Pc and the presence region P2 of the frame portion Pf in the read image, for the tint of the captured image Pc, the balance for the color (specifically, white, black, or blue) of the frame portion Pf is analyzed as the first content. Based on such an analysis result of the first content, an optimum color of the frame portion Pf according to the tint of the captured image Pc, in other words, an optimum color (type) of the film used for creating the printed matter is proposed. For example, a film is proposed in which the frame portion Pf is a dark color in a case in which the captured image Pc is captured with a bright tint. As described above, information related to the creation of the printed matter (specifically, a selection method of a film) may be acquired as the second support information based on the analysis result of the first content related to the image capturing of the captured image.

Further, in the embodiment described above, the support information is provided to the user by being displayed on the screen of the information processing terminal 10 constituting the image analysis apparatus, but the method of providing the support information to the user is not particularly limited. For example, the support information may be provided by a method of transmitting an email indicating the support information to the user, a method of playing back a voice representing support information, or a method of using a service on the SNS, such as posting or exchanging a message on the SNS, for a user who uses an SNS account. In addition, the screen for displaying the support information may be a screen displayed in a case of activating the scan application, or may be an initial screen (standby screen) of the information processing terminal 10.

In addition, the method of providing the support information to the user is not limited to the method of displaying or using the support information itself, and a method of giving a notification that there is the support information acquired by the information processing terminal 10 can also be included. The notification means in such a case is not particularly limited, and for example, a light emitting unit of the information processing terminal 10 may be made to be turned on and off, or a predetermined icon or object may be displayed on the screen of the information processing terminal 10.

Further, the support information display screen may be a screen configured by using the display provided in the information processing terminal 10 itself, or may be a screen configured by using a display device connected to the information processing terminal 10 in a wired or wireless manner. It should be noted that the display device connected to the information processing terminal 10 can include a head mounted display (HMD), such as VR goggles, in addition to a general stationary display.

In addition, in the embodiment described above, the printed matter of the captured image is created by the printer-equipped camera, but the present invention is not limited to this. The device that creates the printed matter of the captured image is not particularly limited as long as the device can acquire the image data of the image captured by the camera to print the image (captured image) indicated by the image data on the medium. For example, the printed matter may be created by a printer that is separate from the camera, specifically, a home printer set in the user's home, or a store-installed printer that can be used in a case in which the user visits a store or the like.

In addition, in the embodiment described above, the printer-equipped camera is a printer-equipped analog camera that optically executes a process up to the printing of the captured image, but the present invention is not limited to this. The printer-equipped camera may be a printer-equipped digital camera that generates the image data (digital image data) of the captured image in conjunction with the acquisition of the captured image. In such a case, the printed matter P may be created by printing the captured image on the film based on the image data of the captured image.

In addition, the printer-equipped digital camera described above may acquire the image data of the image captured by another digital camera, and may create the printed matter P by printing the image indicated by the image data on the film based on the acquired image data.

Further, in the embodiment described above, the reading of the printed matter P, the analysis of the read image, and the display of the support information are all executed by the same apparatus, that is, one information processing terminal 10, but the present invention is not limited to this. An apparatus that executes one of the reading of the printed matter P, the analysis of the read image, or the acquisition and provision (display) of the support information, and an apparatus that executes the remaining steps may be different from each other.

In addition, in the embodiment described above, the correction of the read image or the sample image is executed by the information processing terminal 10 constituting the image analysis apparatus, but the present invention is not limited to this. For example, an apparatus other than the image analysis apparatus, specifically, a PC or a server computer other than the information processing terminal 10, may execute the image correction.

In addition, in the embodiment described above, the function of the image analysis apparatus according to the embodiment of the present invention is exerted by the processor 41 provided in the information processing terminal 10, but the present invention is not limited to this. The processor provided in the image analysis apparatus according to the embodiment of the present invention may be provided in another computer, such as a server that communicates with the information processing terminal 10. That is, a part or all of the above-described functional units provided in the image analysis apparatus according to the embodiment of the present invention may be provided in another computer, such as a server that communicates with the information processing terminal 10.

Figure 12:
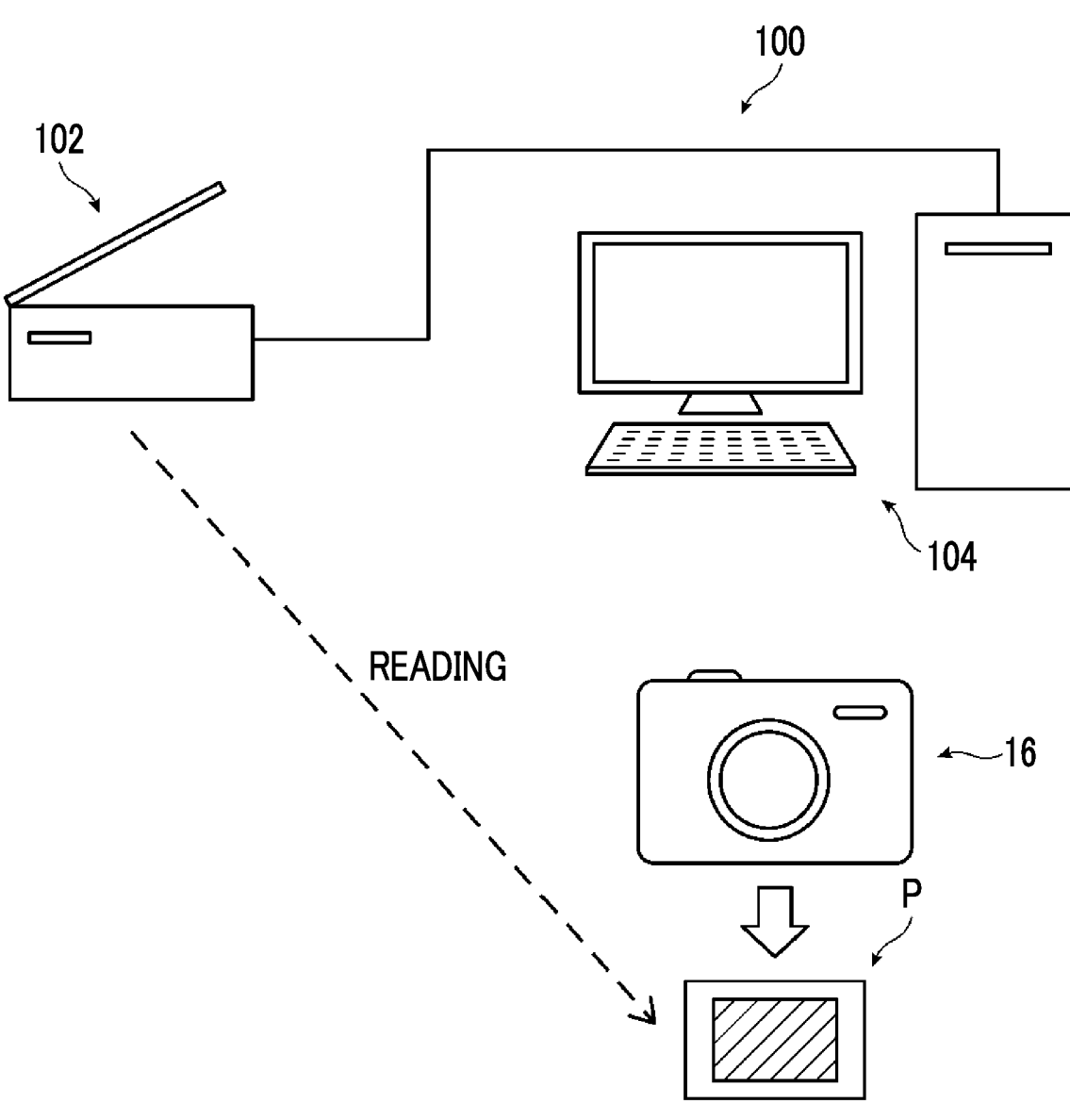
FIG. 12 is a diagram showing an image analysis system according to the embodiment of the present invention.

In addition, in the embodiment described above, the image analysis apparatus configured by using the information processing terminal 10 is described as the embodiment of the present invention. However, the present invention is not limited to this, and as another embodiment of the present invention, a case can be considered in which an image analysis system configured by using a plurality of apparatuses is used. As shown in FIG. 12, this image analysis system (hereinafter, image analysis system 100) includes the printer-equipped camera 16, a reading apparatus 102, and a data processing apparatus 104.

The printer-equipped camera 16 is the same apparatus as the apparatus described above, and creates the printed matter P on which the captured image is printed. The reading apparatus 102 is an apparatus comprising an image sensor, such as a scanner, and reads the printed matter P to acquire image data (read image data) of the read image. The data processing apparatus 104 is configured by using a personal computer, a server computer, or the like, and executes a first analysis process, a first provision process, a second analysis process, and a second provision process. The first analysis process is a process of analyzing the first content related to the printed matter P based on the read image data described above. The first provision process is a process of acquiring the first support information related to the reading method of the printed matter P to provide the first support information to the user based on the analysis result of the first content. The second analysis process is a process of analyzing the second content related to the image capturing of the captured image based on the read image data described above. The second provision process is a process of acquiring the second support information related to the image capturing method of the captured image to provide the second support information to the user based on the analysis result of the second content.

It should be noted that, in a case in which the data processing apparatus 104 is configured by using the server computer, the user need only read the printed matter P by a camera-equipped smart device, a scanner, or the like to upload the image data of the read image to the server computer. Then, the processor of the server computer executes the first analysis process, the first provision process, the second analysis process, and the second provision process by using the uploaded read image data. The user can check the support information by downloading the support information provided in the first provision process or the second provision process, and displaying the support information on the screen of the information processing terminal.

The processor provided in the image analysis apparatus according to the embodiment of the present invention includes various processors. Examples of the various processors include a CPU, which is a general-purpose processor that executes software (program) and functions as various processing units.

Moreover, various processors include a programmable logic device (PLD), which is a processor of which a circuit configuration can be changed after manufacturing, such as a field programmable gate array (FPGA).

Moreover, the various processors described above also include a dedicated electric circuit, which is a processor having a circuit configuration specially designed for executing a specific process, such as an application specific integrated circuit (ASIC).

Moreover, one processing unit provided in the image analysis apparatus according to the embodiment of the present invention may be configured by using one of the various processors described above, or may be configured by using a combination of two or more processors of the same type or different types, for example, a combination of a plurality of FPGAs or a combination of an FPGA and a CPU.

Moreover, a plurality of functional units provided in the image analysis apparatus according to the embodiment of the present invention may be configured by using one of various processors, or may be configured by using one processor in which two or more of the plurality of functional units are combined.

Moreover, as in the embodiment described above, a form may be adopted in which one processor is configured by using a combination of one or more CPUs and software, and the processor functions as the plurality of functional units.

Moreover, for example, as represented by a system on chip (SoC) or the like, a form may be adopted in which a processor is used in which the functions of the entire system which includes the plurality of functional units in the image analysis apparatus according to the embodiment of the present invention are realized by a single integrated circuit (IC) chip. Moreover, a hardware configuration of the various processors described above may be an electric circuit (circuitry) in which circuit elements, such as semiconductor elements, are combined.

EXPLANATION OF REFERENCES

10: information processing terminal
12: network
14: information provision server
16: printer-equipped camera
21: reading unit
22: storage unit
23: reception unit
24: analysis unit
25: correction unit
26: learning unit
27: search unit
28: acquisition unit
29: provision unit
31: first specifying unit
32: second specifying unit
33: third specifying unit
34: first analysis unit
35: second analysis unit
36: third analysis unit
37: determination unit
38: recognition unit
41: processor
42: memory
43: communication interface
44: input device
45: output device
46: storage
47: imaging device
51: first acquisition unit
52: second acquisition unit
53: third acquisition unit
54: fourth acquisition unit
100: image analysis system
102: reading apparatus
104: data processing apparatus
P: printed matter
Pc: captured image
Pf: frame portion
P1, P2, P3: presence region

What is claimed is:
1. An image analysis apparatus comprising:
a processor, and
a display,
wherein the processor executes
a process of reading a printed matter on which a captured image is printed to acquire image data of a read image,
a process of analyzing a first content related to reading of the printed matter based on the image data,
a process of determining that the reading of the printed matter has failed in a case in which an analysis result of the first content does not satisfy a first threshold value set for determining a quality of reading of the printed matter, and acquiring first support information based on the analysis result of the first content,
a process of displaying advice on a reading method of the printed matter, via the display, based on acquiring the first support information using code information for connection to a provision source of support information related to the reading method of the printed matter, a process of determining that the printed matter has been read normally in a case in which the analysis result of the first content satisfies the first threshold value, and, without acquiring the first support information, analyzing a second content related to image capturing of the captured image based on the image data, a process of determining that the capturing of the captured image has failed in a case in which an analysis result of the second content does not satisfy a second threshold value set for determining a quality of the image capturing, and acquiring second support information based on the analysis result of the second content, a process of displaying advice on an image capturing method of the captured image, via the display, based on acquiring the second support information using code information for connection to a provision source of support information related to the image capturing method of the captured image, and a process of determining that the captured image has been captured normally in a case in which the analysis result of the second content satisfies the second threshold value, without acquiring the second support information, wherein the first support information includes at least one of information including the advice on the reading method of the printed matter and code information for connection to the provision source of support information related to the reading method of the printed matter, and wherein the second support information includes at least one of information including the advice on the image capturing method of the captured image and code information for connection to the provision source of support information related to the image capturing method of the captured image.

2. The image analysis apparatus according to claim 1, wherein the processor further executes a process of analyzing a third content related to an image quality of the captured image based on the image data, and a process of acquiring third support information related to an image capturing method or a correction method of the captured image based on an analysis result of the third content.

3. The image analysis apparatus according to claim 1, wherein, in the process of analyzing the first content, the processor analyzes the first content by targeting at least a part of a region of the read image.

4. The image analysis apparatus according to claim 1, wherein, in the process of analyzing the first content, the processor specifies a presence region of the printed matter from an inside of the read image, and analyzes the first content by targeting at least one of the specified presence region of the printed matter and a region other than the presence region.

5. The image analysis apparatus according to claim 1, wherein, in a case in which the printed matter includes a frame portion that surrounds the captured image, in the process of analyzing the first content, the processor specifies a presence region of the frame portion from an inside of the read image, and analyzes the first content by targeting at least one of the specified presence region of the frame portion and a region other than the presence region.

6. The image analysis apparatus according to claim 1, wherein, in the process of analyzing the second content, the processor specifies a presence region of the captured image from an inside of the read image, and analyzes the second content by targeting the specified presence region of the captured image.

7. The image analysis apparatus according to claim 1, wherein the processor executes a process of displaying a correction image obtained by correcting the read image according to the analysis result of the first content or the second content on a screen.

8. The image analysis apparatus according to claim 1, wherein the processor executes a process of displaying a correction sample image obtained by correcting a sample image different from the read image according to the analysis result of the first content or the second content on a screen.

9. The image analysis apparatus according to claim 1, wherein the processor further executes a process of receiving a correction operation executed by a user in a case of correcting the read image, and a process of acquiring fourth support information related to image correction according to the received correction operation.

10. The image analysis apparatus according to claim 9, wherein, in the process of acquiring the fourth support information, the processor acquires the fourth support information based on a learning result of machine learning based on a usage history of the fourth support information by the user, or a learning result of machine learning based on an execution history of the correction operation by the user.

11. An image analysis system comprising:

a reading apparatus that reads a printed matter on which a captured image is printed to acquire image data of a read image; and a data processing apparatus that receives the image data and includes a display, wherein the data processing apparatus executes a process of analyzing a first content related to reading of the printed matter based on the image data, a process of determining that the reading of the printed matter has failed in a case in which an analysis result of the first content does not satisfy a first threshold value set for determining a quality of reading of the printed matter, and acquiring first support information based on the analysis result of the first content, a process of displaying advice on a reading method of the printed matter, via the display, based on acquiring the first support information using code information for connection to a provision source of support information related to the reading method of the printed matter, a process of determining that the printed matter has been read normally in a case in which the analysis result of the first content satisfies the first threshold value, and, without acquiring the first support information, analyzing a second content related to image capturing of the captured image based on the image data, a process of determining that the capturing of the captured image has failed in a case in which an analysis result of the second content does not satisfy a second threshold value set for determining a quality of the image capturing, and acquiring second support information based on the analysis result of the second content, a process of displaying advice on an image capturing method of the captured image, via the display, based on acquiring the second support information using code information for connection to a provision source of support information related to the image capturing method of the captured image, and a process of determining that the captured image has been captured normally in a case in which the analysis result of the second content satisfies the second threshold value, without acquiring the second support information, wherein the first support information includes at least one of information including the advice on the reading method of the printed matter and code information for connection to the provision source of support information related to the reading method of the printed matter, and wherein the second support information includes at least one of information including the advice on the image capturing method of the captured image and code information for connection to the provision source of support information related to the image capturing method of the captured image.

12. An image analysis method comprising:

a step of reading a printed matter on which a captured image is printed to acquire image data of a read image via a processor;

a step of analyzing a first content related to reading of the printed matter based on the image data via the processor;

a step of determining that the reading of the printed matter has failed in a case in which an analysis result of the first content does not satisfy a first threshold value set for determining a quality of reading of the printed matter, and acquiring first support information based on the analysis result of the first content;

a step of displaying advice on a reading method of the printed matter, via a display, based on acquiring the first support information using code information for connection to a provision source of support information related to the reading method of the printed matter;

a step of determining that the printed matter has been read normally in a case in which the analysis result of the first content satisfies the first threshold value, and, without acquiring the first support information, analyzing a second content related to image capturing of the captured image based on the image data;

a step of determining that the capturing of the captured image has failed in a case in which an analysis result of the second content does not satisfy a second threshold value set for determining a quality of the image capturing, and acquiring second support information based on the analysis result of the second content;

a process of displaying advice on an image capturing method of the captured image, via the display, based on acquiring the second support information using code information for connection to a provision source of support information related to the image capturing method of the captured image; and a step of determining that the captured image has been captured normally in a case in which the analysis result of the second content satisfies the second threshold value via the processor, without acquiring second support information, wherein the first support information includes at least one of information including the advice on the reading method of the printed matter and code information for connection to the provision source of support information related to the reading method of the printed matter, and wherein the second support information includes at least one of information including the advice on the image capturing method of the captured image and code information for connection to the provision source of support information related to the image capturing method of the captured image.

13. A non-transitory computer-readable recording medium on which a program for causing a computer to execute each step included in the image analysis method according to claim 12 is recorded.

* * * * *